June 10, 1958

F. A. LOPEZ 2,838,174

RECORD SORTING MACHINES

Filed May 8, 1952

INVENTOR.
FRANK A. LOPEZ

BY

ATTORNEYS

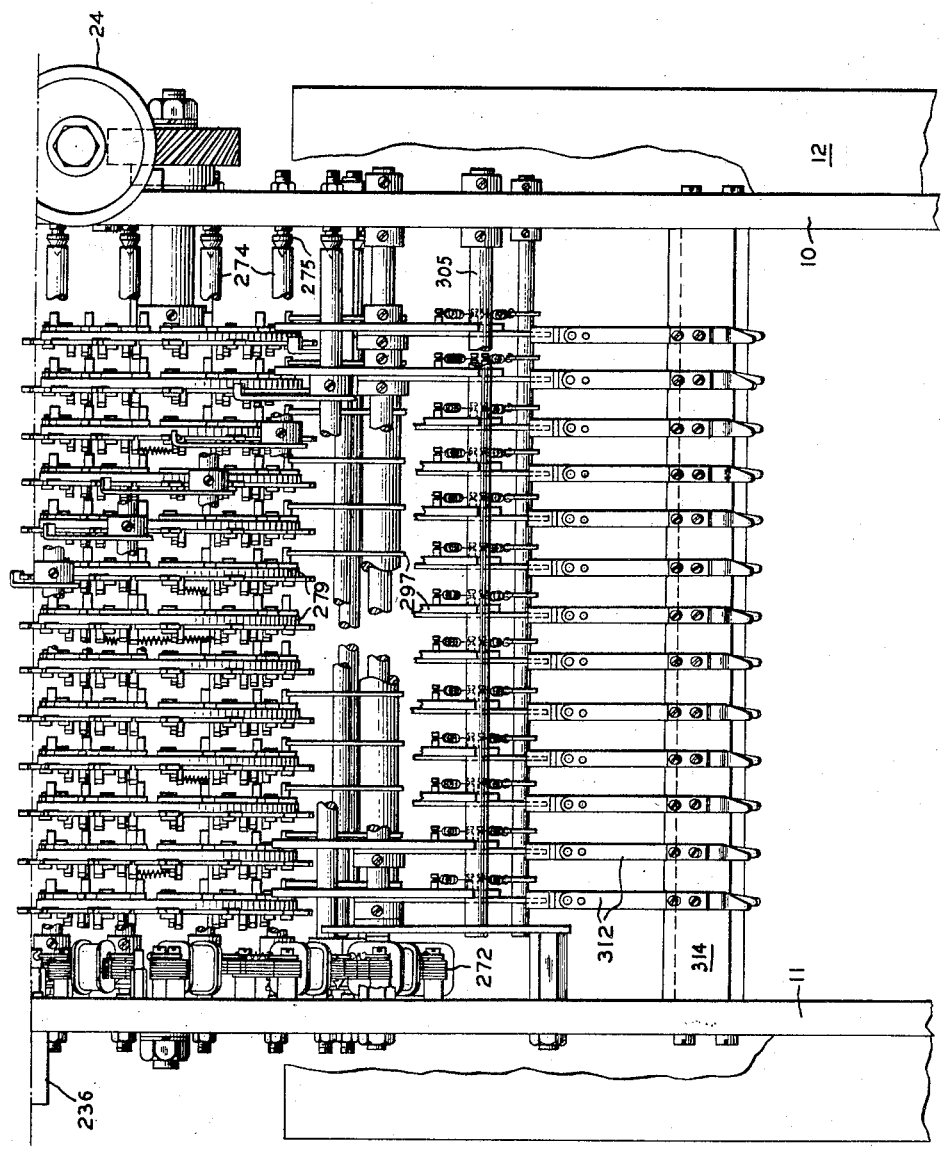
FIG. IA.
INVENTOR.
FRANK A. LOPEZ

INVENTOR.
FRANK A. LOPEZ

June 10, 1958  F. A. LOPEZ  2,838,174
RECORD SORTING MACHINES
Filed May 8, 1952  15 Sheets-Sheet 4

INVENTOR.
FRANK A. LOPEZ
BY
ATTORNEYS

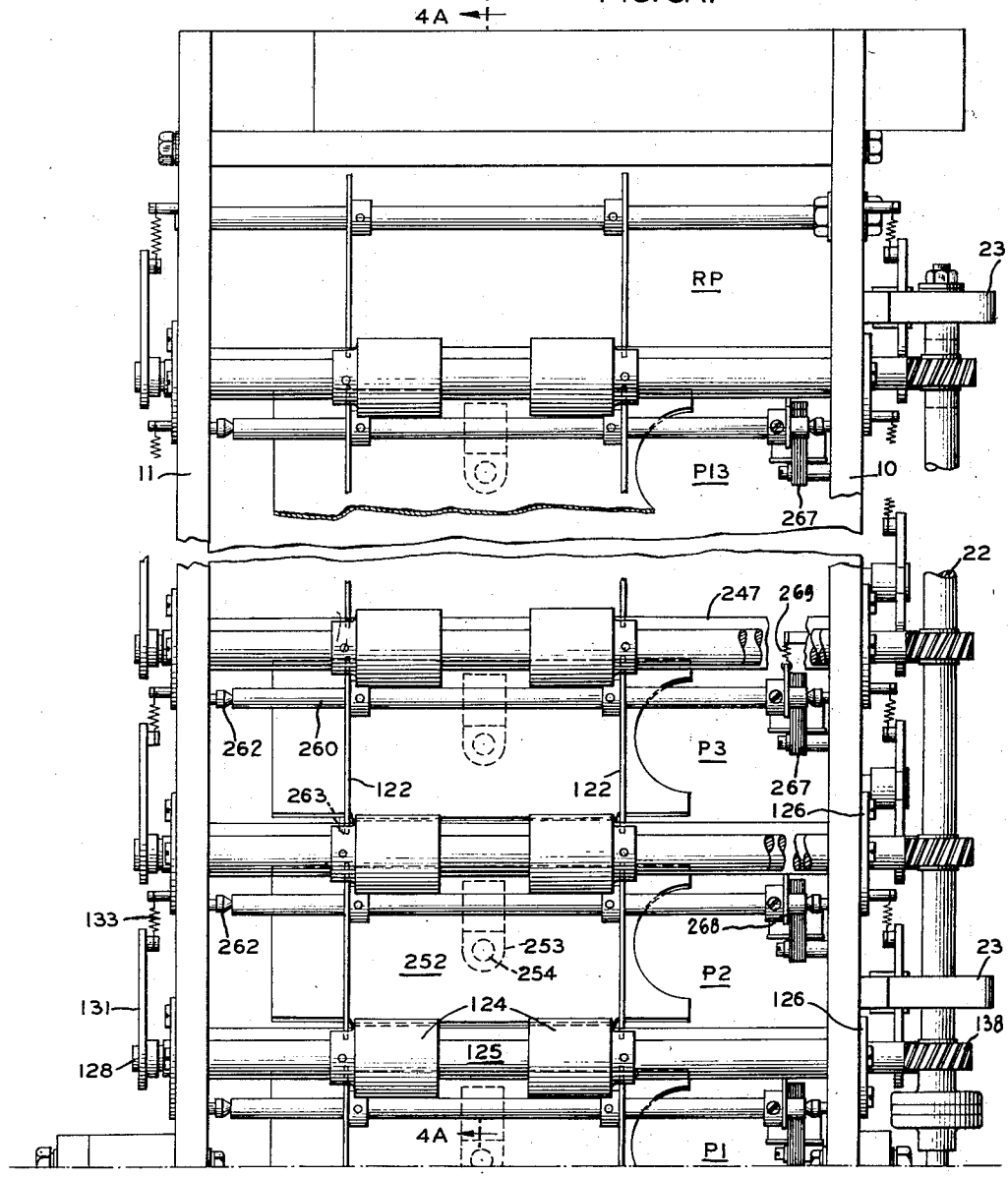

June 10, 1958  F. A. LOPEZ  2,838,174
RECORD SORTING MACHINES
Filed May 8, 1952  15 Sheets-Sheet 6

INVENTOR.
FRANK A. LOPEZ
BY
ATTORNEYS

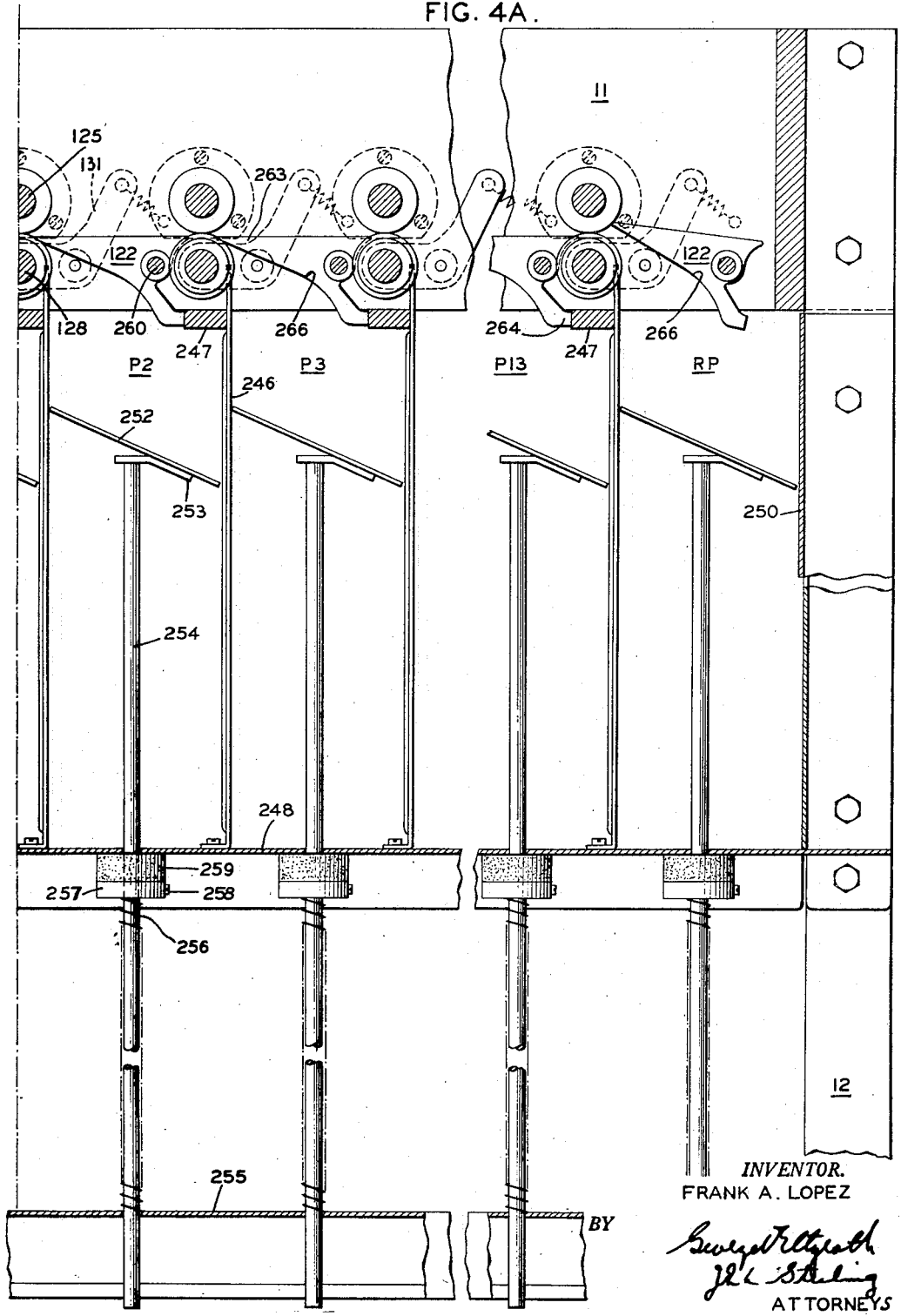

June 10, 1958 F. A. LOPEZ 2,838,174
RECORD SORTING MACHINES
Filed May 8, 1952 15 Sheets-Sheet 8

Inventor
FRANK A. LOPEZ

June 10, 1958     F. A. LOPEZ     2,838,174
RECORD SORTING MACHINES
Filed May 8, 1952     15 Sheets-Sheet 9

*INVENTOR.*
FRANK A. LOPEZ

BY

ATTORNEYS

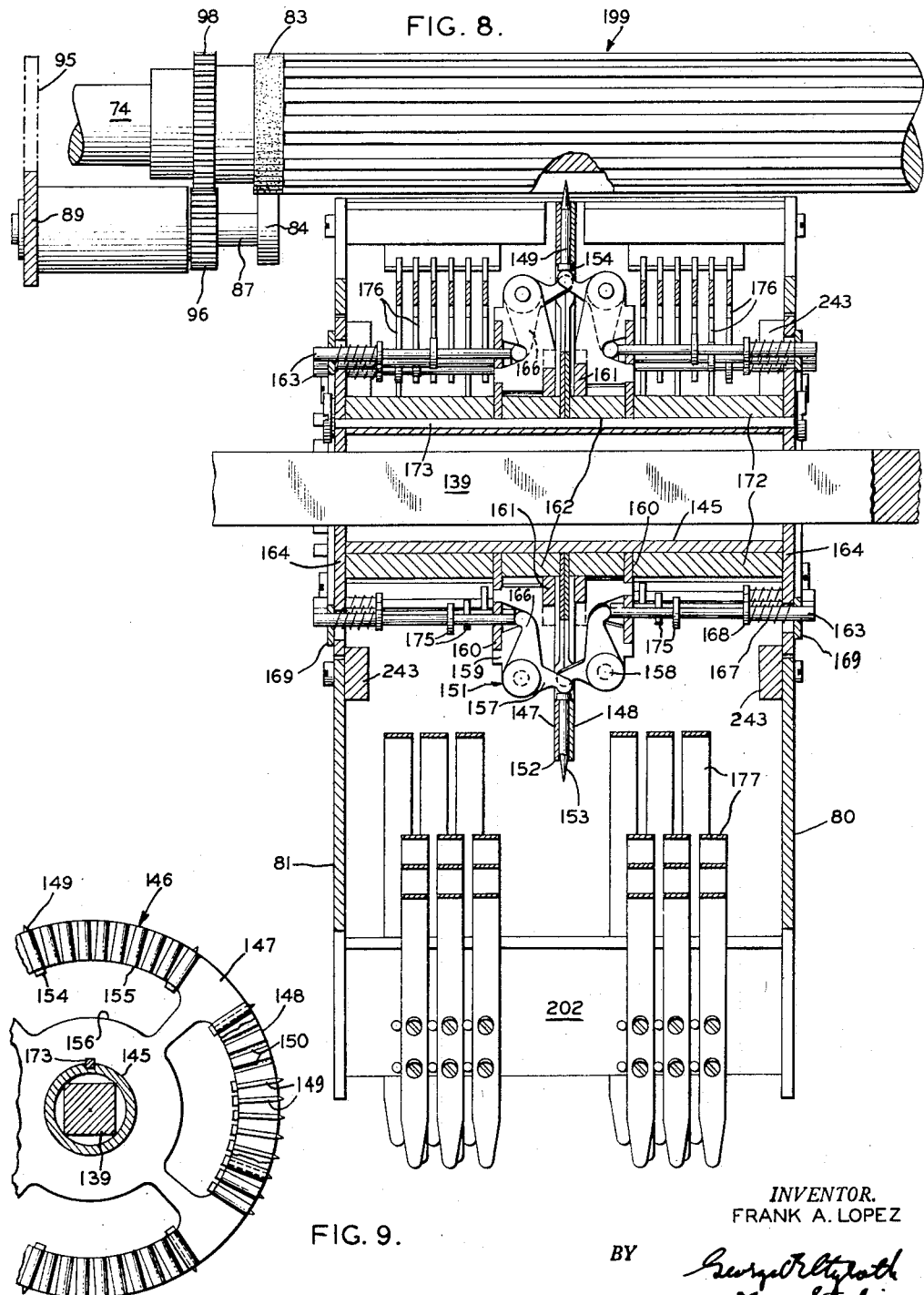

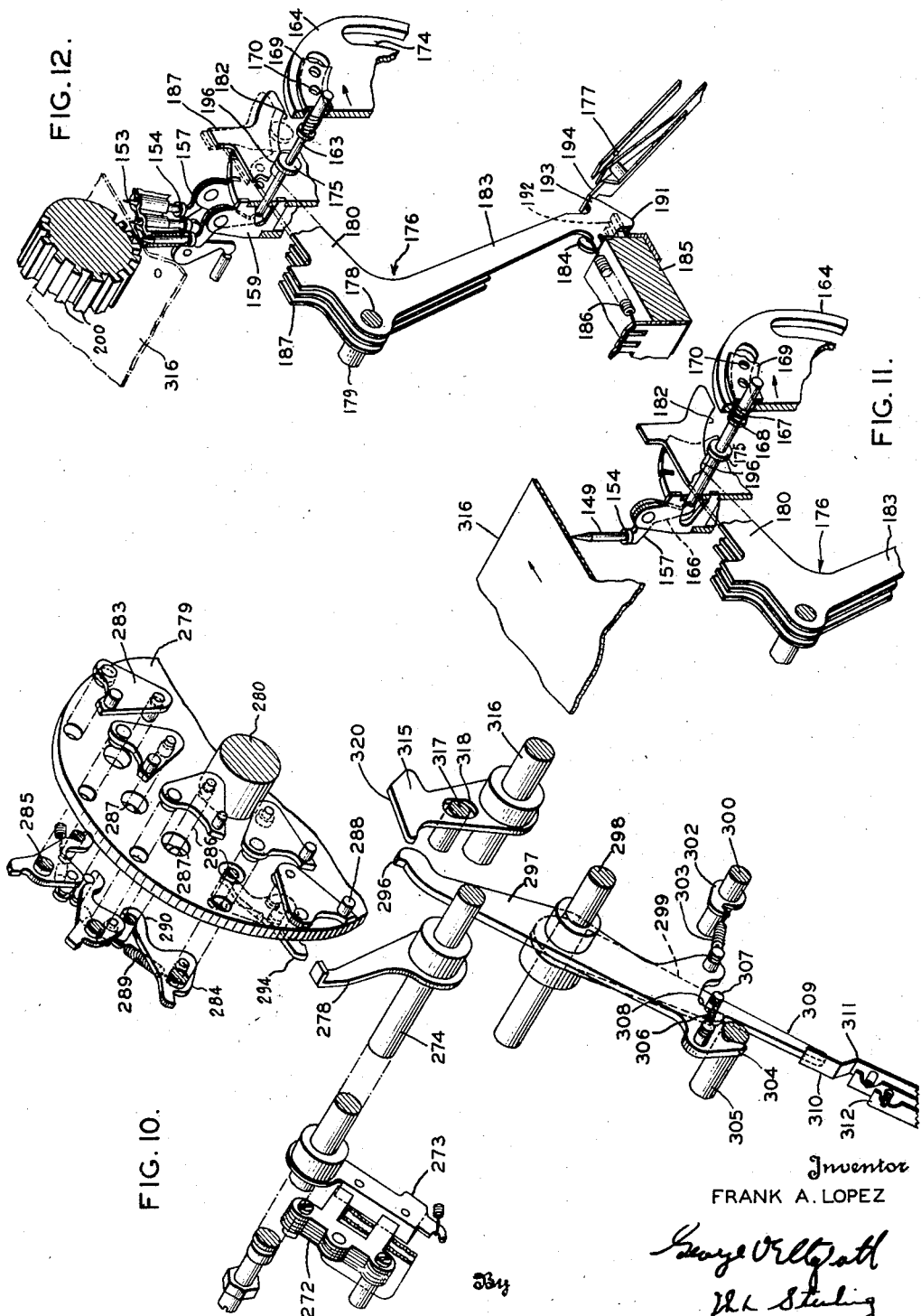

June 10, 1958 F. A. LOPEZ 2,838,174
RECORD SORTING MACHINES
Filed May 8, 1952 15 Sheets-Sheet 12

INVENTOR.
FRANK A. LOPEZ
BY
ATTORNEYS

June 10, 1958   F. A. LOPEZ   2,838,174
RECORD SORTING MACHINES
Filed May 8, 1952   15 Sheets-Sheet 13

Inventor
FRANK A. LOPEZ

By
Attorneys

June 10, 1958  F. A. LOPEZ  2,838,174
RECORD SORTING MACHINES
Filed May 8, 1952  15 Sheets—Sheet 15

*INVENTOR.*
FRANK A. LOPEZ
BY
ATTORNEYS

United States Patent Office 2,838,174
Patented June 10, 1958

2,838,174

RECORD SORTING MACHINES

Frank A. Lopez, Stamford, Conn., assignor to Sperry Rand Corporation, a corporation of Delaware Application May 8, 1952, Serial No. 286,729

8 Claims. (Cl. 209—110)

This invention relates to new and useful improvements in punched card sorting machines, and it represents a decided advance in the fields of science and the useful arts. It is particularly concerned with a high speed, punched card, electrical sorting machine, that is capable of sensing and sorting statistical cards at the high rate of one thousand per minute. It has for its general purpose a sorting machine that is electrical in character and possesses not only a high degree of efficiency and accuracy of operation, but also a high rate of speed in the feeding, analysing and distributing of the cards to be sorted.

The efficiency and certainty with which the machine operates is accomplished through the general combination and peculiar organization of an improved card feed mechanism, a novel type of sensing unit, a decoding arrangement and a generally simplified card distribution system. In this machine punched statiscal cards are fed from a card magazine and sensed while in motion by a novel sensing head that is adapted to revolve at a high rate of speed and to sense four cards with each revolution. In the sensing operation electrical circuits are closed to a decoding unit which, upon completion of the sensing cycle, elicits a single circuit to a timing mechanism. The latter in turn prepares electrical contacts for the opening of a particular pocket for reception of the sensed card.

A principal object of the invention is to provide a practical and high speed form of sorting mechanism operable under electrical impulses initiated by the sensing of perforations in a record card.

Another object of the invention is an improved card sorting machine, electrical in character and having novel sensing and card distributing means.

A further object of the invention is a greatly simplified timing unit that controls the distribution of the cards to their respective pockets.

The invention further resides in the improved and novel construction of its several elements and in their novel arrangement and organization in operative combination, as will be more fully presented and described herein.

The foregoing advantages and objects of this invention, as well as others, will become manifest as this specification unfolds in greater detail and as it is read in conjunction with the accompanying drawings, in which Figs. 1 and 1A represent a front elevational view of the machine with several of the parts broken away;

Fig. 2 discloses a right side elevational view of the forward part of the machine;

Figs. 3 and 3A represent a top plan view;

Figs. 4 and 4A comprise a longitudinal vertical section through the machine taken on the line 4—4A of Figs. 3 and 3A;

Fig. 8 represents an enlarged cross section through the sensing head, taken on the line 8—8 of Fig. 4;

Fig. 9 is a detail of the sensing disc member;

Fig. 10 is a detail of a timing disc fragment partly in exploded view and showing the relation of associated parts;

Fig. 11 is a detail illustrating a sensing pin forced downward by the undersurface of a card and showing the consequent position of a plunger cam out of the path of movement of its related contact closing element;

Fig. 12 is a detail illustrating the penetration of a card by a sensing pin and the arrangement of its related parts;

Figure 18:
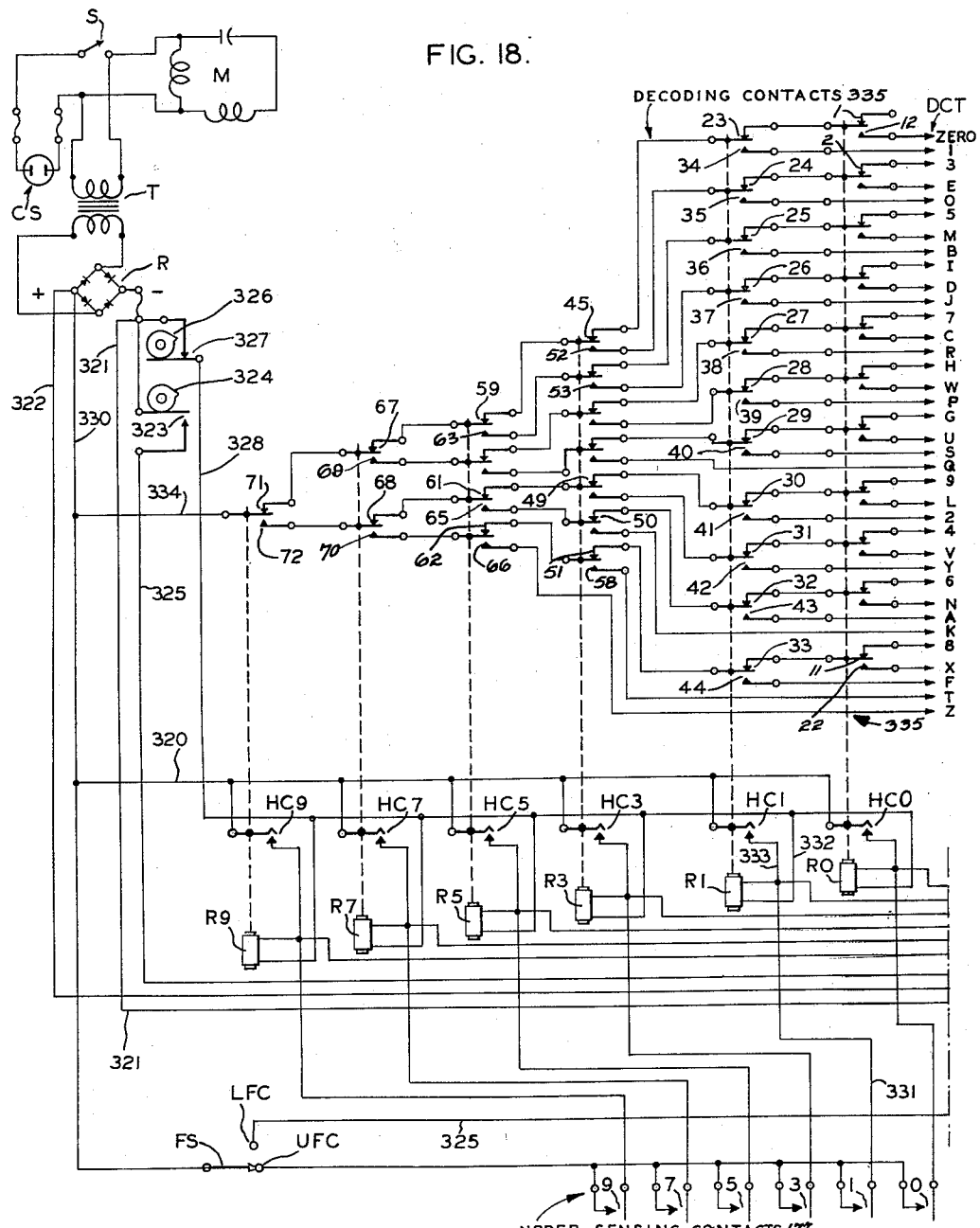
Figure 18A:
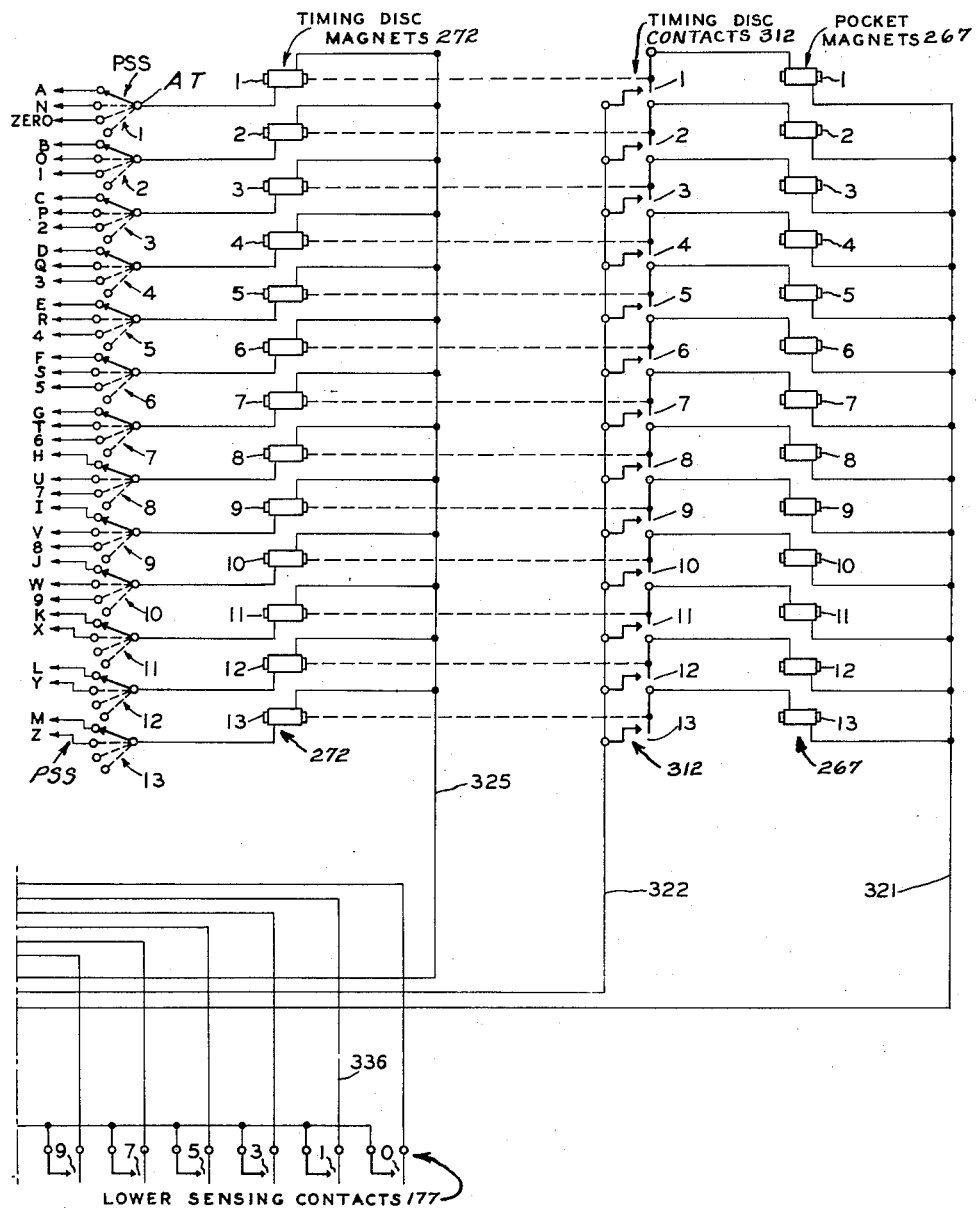

Figs. 18 and 18A comprise a circuit diagram for the machine.

GENERAL NATURE

In general, the sorting machine of the present invention comprises reciprocating card feed mechanism by which a perforated statistical card is fed to a rotating sensing head. The sensing head is adapted with each revolution thereof to sense four cards, and is equipped with four sets of sensing pins containing twelve pins to a set for this purpose. The sensing head is adapted to sense one column at a time of a conventional statistical card, and it may be adjusted manually to different column sensing positions. Sensing takes place while the sensing head is in motion and the perforated card is being conveyed over it. Upon finding a hole in a card column, one of the sensing pins penetrates the hole. This sensing operation causes various electrical contacts to close, resulting in one or more circuits to a decoding system and subsequent a single circuit to suitable timing mechanism. The timing mechanism comprises a number of timing discs elements, each controlling a particular card receiving pocket of the machine, and the timing disc affected by the decoded circuit of the card sensed determines the time its related pocket will open to receive the card. There are fourteen card receiving pockets. These with the exception of the fourteenth pocket, are normally closed and are opened by electromagnets controlled by the timing mechanism. The fourteenth or last pocket of the machine is permanently opened and serves to receive reject cards, those not sensed. The cards are fed by a high speed reciprocating feed mechanism from a stacked card magazine, and are conveyed over the revolving sensing head to the various pockets by sets of pairs of rollers.

FRAMEWORK AND DRIVE

Figs. 1, 1A, 2

Referring to the drawings, the framework of the machine wherein the various mechanisms of the machine are supported comprises a right and a left frame section 10, 11, suitably supported by a proper number of legs 12 shown in part, and held together by the various cross members which they support.

The various mechanisms of the machine, including the reciprocating card feed mechanism, the rotating sensing unit, the timing means and the card conveyor system, are driven through various gears and shafts connected by pulley and belt means to a suitable motor and are adapted to turn in proper synchronism with one another and in timed relation to the movement, sensing and decoding and pocketing of a statistical card.

The pulley and belt means 14 connects the motor M shown diagrammatically in the wiring diagram Fig. 18, horizontal drive shaft 15 which is carried for rotatable movement in suitable block bearings 16 secured to the outside of the right frame plate 10. Drive shaft 15 is connected by beveled gearing 17 to a vertical drive shaft 18 which is carried in suitable block bearings 19 bracketed to the outside of the right frame plate. Beveled gearing 20 connects the vertical drive shaft with an upper horizontal drive shaft 22 extending rearwardly substantially the length of the machine and carried for rotatable movement in suitable bearings 23 bracketed along the outside of the right frame plate.

Through various gears and cross shafts connected with these drive shafts continuous motion is communicated to the various driven parts of the machine.

A hand wheel 24 carried fast upon the forward end of the lower drive shaft 15 permits application of manual power to the drive shafts in lieu of electrical power when it is desired to make repairs or adjustments to the machine and a slow movement of the various parts is desired.

CARD FEEDING SYSTEM

*Figs. 1, 2, 4, 5*

Suitable card feeding mechanism is provided in the machine. The card feed system here is of the reciprocating type reciprocated by rotary means, and is supported in the framing at the upper forward part of the machine. It comprises a cam wheel 25 keyed intermediately of a rotatable short shaft 26 which is carried at its ends in suitable bearings 27, 28. The latter are mounted in suitable manner in a pair of depending parallel cross arms 29, 30 of a cross bracket 32, which bracket bridges the right and left frame plates 10, 11, and is rigidly supported at its ends upon a pair of block supports 33 fixed to the inner walls of the right and left frame members.

Keyed on to the cam wheel shaft 26 is a gear 34 in mesh with another gear 35 mounted fast upon a cross shaft 36. Shaft 36 is carried in suitable manner for rotatable movement at its ends in the right and left frame members. A projection of shaft 36 through the right frame member carries fast thereon a gear 37 which is separated from the frame wall by a spacer bearing 38 and which gear is in mesh with a gear 39 secured intermediately of the vertical drive shaft 18. When the machine is in operation, motion of this vertical drive shaft is communicated through the gearing outlined to continuously rotate the cam wheel 25.

Upon rotation of the cam wheel a reciprocal forward and rearward movement is communicated to a conventional picker knife assembly which acts to pick a statistical card from a card magazine and feed it to the sensing mechanism.

The card magazine assembly provided is of a conventional nature and is generally designated 40. Its various parts, including the throat adjusting mechanism generally designated 41, the magazine end plates 42, and the card supporting plate 43, are mounted upon a suitable bracket 45. This bracket bridges the right and left frame plates and is secured at its right and left ends atop the cam wheel bracket 32.

Secured to the right and left undersides of magazine bracket 45 is suitable slide plate bearing means, including a pair of bearing plates 46 and a pair of flanged bearing blocks 47. A pair of slots 48 exist between the bearing plates 46 and the flanged portion of the bearing blocks. These slots are adapted to bear for reciprocal forward and rearward sliding movement therein a slide plate 49. On the forward end of the slide plate is suitably mounted conventional card picker means, including a block 50 and a knife 52.

Carried on studs 53 on the underside of the picker knife slide plate 49 is a pair of rollers 54 positioned for rolling contact, one on either side, with the side marginal faces 55 of the cam wheel. The side faces 55 of the cam wheel are distorted or moved in such a manner that rotation of the cam wheel between the rollers effects a reciprocating, or forward and rearward movement of the slide plate 49 upon which the picker knife 52 is mounted, and whereby the picker knife in a conventional to and fro action picks the lowermost card from a stack of cards in the card magazine and carries it forward through the magazine throat 56 into the conveying rollers of the machine.

The cam curve of the side faces 55 of the cam wheel is such that with each cycle of the cam wheel the picker knife is reciprocated once through a forward and rearward movement and one card is fed through suitable conveying rollers to the sensing unit.

CARD CONVEYING SYSTEM

*Figs. 2–5, 8*

Suitable means is provided in the machine for conveying the cards picked from the card magazine to the sensing unit and, after analysis of the cards by the sensing unit, to their destined pockets. The card conveying system employed here comprises suitable sets of pairs of rollers, which are continuously driven while the machine is in operation through various gears and shafts deriving their motive power through the continuously rotating upper drive shaft 22.

Operation of the picker knife assembly serves to advance each card picked to a first set of rollers comprising a pair of upper roller elements 57 in contact with a pair of lower roller elements 58.

The lower roller elements are surfaced with suitable gripping material, such as rubber stock, and are carried fast upon a cross shaft 59 which is suitably carried for rotatable movement in the right and left frame members of the machine.

The upper roller elements 57 are part of a floating cross shaft 62, the right and left ends of which shaft extend through enlarged opening 63 of the frame work, in which openings the shaft is adapted to float. The shaft ends are suitably contained for rotatable movement of the shaft in a pair of angular arms 64, one on each side of the machine. Arms 64 are pivoted at their apexes 65 upon studs affixed to the outside walls of the framework.

A spring 67 on each arm serves to tension the upper roller cross shaft 62 counter-clockwise, so as to keep its roller elements in constant contact with the lower roller elements and to maintain a gear 68 fixed upon the upper roller cross shaft in constant mesh with another gear 69 fixed upon the lower roller shaft 59. Through this gearing rotatable movement is communicated to the upper roller shaft through the lower roller shaft. The latter shaft derives its motive power ultimately from the upper rearwardly extending drive shaft 22.

To effect this rotation of the lower roller shaft 59 through drive shaft 22, shaft 59 carries fast upon its left end, which end extends slightly beyond the left framing, a large gear 70. A suitable member 72 spaces the gear from the frame work. Gear 70 is in constant mesh with another large gear 73 mounted fast upon the left end of another cross shaft 74, the left end of which extends slightly through the frame work. A suitable bearing spacer 75 separates gear 73 from the frame work. Cross shaft 74 is suitably carried for rotatable movement in the right and left frame plates and derives its motion through proper gearing connecting it to the upper extended drive shaft 22. Near the right end of the cross shaft 74, which end extends slightly through the framework, is a gear 76 in contant mesh with a drive gear 78 carried upon the upper drive shaft 22. Through this gearing, motion to the upper and lower roller shafts 62, 59 is ultimately communicated.

The first set of rollers serve to convey the picked card over a first guide plate 79 to the revolving sensing head, later to be described. Guide plate 79 spans the right and left frame plates 80, 81 of the sensing unit carriage hereinafter described.

The card is next gripped by a second set of rollers and is carried by these over the revolving sensing head. The cross shaft 74, previously mentioned, is an element of this second set of rollers. Here, cross shaft 74 has mounted upon it, in proper spaced relation, a pair of roller elements 83, which are in contact for card gripping purposes with a pair of roller elements below 84.

Inasmuch as a cross shaft member between the right and left frames of the machine cannot be provided to carry these lower roller elements, because of the sensing unit interposed intermediately of the machine, they are carried on a pair of stub shafts 87, one to each side of the sensing unit. Each of the stub shafts is carried at one end for rotatable movement in an arm 89 of a two armed member. The two armed members are pivoted upon studs 92 affixed to the inner walls of the right and left machine frame members. Springs 94 secured to framework studs and to upright arms 95 of the two armed members serve to tension their respective stub shafts 87 upwards so as to bring their roller elements 84 respectively in contact with the upper roller elements 83, and also to maintain gears 96, mounted on the stub shafts into constant mesh with gears 98, carried by the upper cross shaft 74, whereby rotation of the latter is automatically communicated to the stub shafts 87.

The picked card is conveyed by this second set of rollers over the revolving sensing head, later described, and over a second guide plate 100.

The travelling card is next gripped by a third set of rollers comprising a pair of roller elements 102 fast on an upper cross shaft 103, which shaft is carried for rotatable movement in suitable bearings in the right and left frame plates. The upper roller elements are in contact with a pair of roller elements 104 fast upon a lower floating cross shaft 105. The lower roller elements are surfaced with suitable gripping material, such as rubber stock.

The lower cross shaft 105 is carried for rotatable movement at its ends, which ends extend slightly through enlarged openings 106 in the right and left frame plates and are carried in a pair of angular arms 107 pivoted on suitable studs 108 on the outside of the right and left frame plates. The lower cross shaft is adapted to float in the enlarged openings, and springs 109 serve to constantly tension it upwards to bring its roller elements in contact with those of the upper cross shaft 102 and also to hold a gear 110 of the lower cross shaft in constant mesh with a gear 112 of the upper cross shaft.

On an end of the upper cross shaft, which extends slightly through the right framing, is mounted a gear 114 suitably spaced from the frame work by a proper bearing and in mesh with a drive gear 116 that is carried by the upper rearwardly extending drive shaft 22. Rotation of the drive shaft 22 is communicated through the various gearing to the cross shafts bearing the upper and lower roller elements 102, 104.

The travelling card, upon being gripped by this third set of rollers, is conveyed by them over another guide plate 118, which is mounted at its ends upon a pair of angle frame brackets 119. The card is then gripped by another set of rollers 120 similar to the last set. Suitable slots 121 are provided in the guide plate 118 to allow free movement of the associated roller elements. Rollers 120 are located immediately before the shutters 122 of the first card receiving pocket P1. If the shutters are in opened position the travelling card, upon leaving rollers 120, will enter the pocket, otherwise the card will be conveyed over the shutter arms 122 to be gripped by a fifth set of rollers immediately before the next pocket P2.

This fifth set of rollers comprise a pair of roller elements 124 fixed upon an upper cross shaft 125, which shafts is carried for rotatable movement in suitable bearing members 126 in the right and left frame members; it also includes a pair of roller elements 127, properly surfaced with suitable card gripping material, such as rubber and fixed upon a lower floating cross shaft 128. The lower roller shaft is adapted to float in enlarged openings similar to the other floating shafts in the right and left frame plates. Shaft 128 is suitably carried at its ends for rotatable movement in a pair of angular arms 131 that are pivoted on studs on the right and left frame plates. Springs 133 serve to tension the lower roller shaft upwards so as to bring its roller elements into constant contact with those of the upper shaft. On an end of the upper roller shaft 125, which end extends through the right framing, is carried a gear 136 in mesh with a drive gear 138 carried by the upper drive shaft 22. Through the various gearing, rotation is communicated through shaft 22 to the upper and lower roller shafts 125, 126. The moving card is thereafter gripped by successive sets of rollers of similar construction as it passes over the shutters of each pocket until it reaches its destined pocket.

THE SENSING SYSTEM

Figs. 2, 4–9, 11, 12

The sensing system serves to analyze each card picked and, upon such analysis determines in accordance with the index position of the card perforations, which of the several pockets will open to receive the card. A card, not containing an index perforation, will be conveyed to the reject pocket RP. The sensing system, upon finding one or more card perforations, creates various electrical circuits to which a suitable timing mechanism is responsive. The latter mechanism controls the various card receiving pockets and causes the opening of the desired pocket at the proper time to receive the sensed card.

The sensing system includes, as an element thereof, a sensing head or unit which includes a sensing pin section in association with a series of cam plungers. The sensing pins, in cooperation with the cam plungers and certain related contact arm elements, effect the closing of certain electrical contacts by which a timing mechanism hereinafter described is eventually actuated.

The sensing head is mounted as a unit upon a square cross shaft 139 that is suitably carried for rotatable movement at its ends in the right and left frame plates of the machine. Shaft 139 is in continuous motion during the operation of the machine and derives its motion through suitable gearing connecting it with the constantly rotating upper main drive shaft 22.

To effect this rotation of shaft 139 there is secured upon the right end of the shaft, which end extends slightly beyond the right frame plate, a large gear 140 separated from the frame member by a suitable bearing spacer. Gear 140 is in mesh with a much smaller gear 143 secured to the extreme right end of the previously mentioned shaft 74 directly above, whereby rotation of shaft 74 is communicated to the square shaft 139 below it. As the square shaft rotates, the sensing head as a unit is adapted to be carried around with it. The gear ratios are such that the sensing unit will make one revolution to four of the feed cam wheel 25.

The sensing unit is confined between the frame plates 80, 81 of a carriage structure, whereby the sensing unit is slidable crosswise along the square shaft. The movement of the sensing unit along the square shaft enables it to be adjusted for the sensing of various card columnar positions. This is done manually, and the mechanism by which this is enabled will be fully detailed later on under the heading of Column Spacing of the Sensing Head.

The sensing unit or head comprises an elongated cylindrical bearing 145 through which the square shaft passes. Fixed midway upon bearing 145 is a disc member generally designated 146 comprising a pair of complementary disc plates 147, 148 secured to one another face to face. Carried between the disc plates for radial slidable movement through the peripheral edge of the disc member is a series of sensing pins 149. The sensing pins are radially disposed in channels 150 formed in groups about the marginal portion of the disc member between the disc plates. The channels comprise grooves in the surface of one disc plate complementary to grooves in the surface of the other. The peripheral edges of the channels form shoulders 152 about the sensing pins. These shoulders promote greater sensing efficiency, in that they serve as supports for the card during the sensing process.

Figure 1:
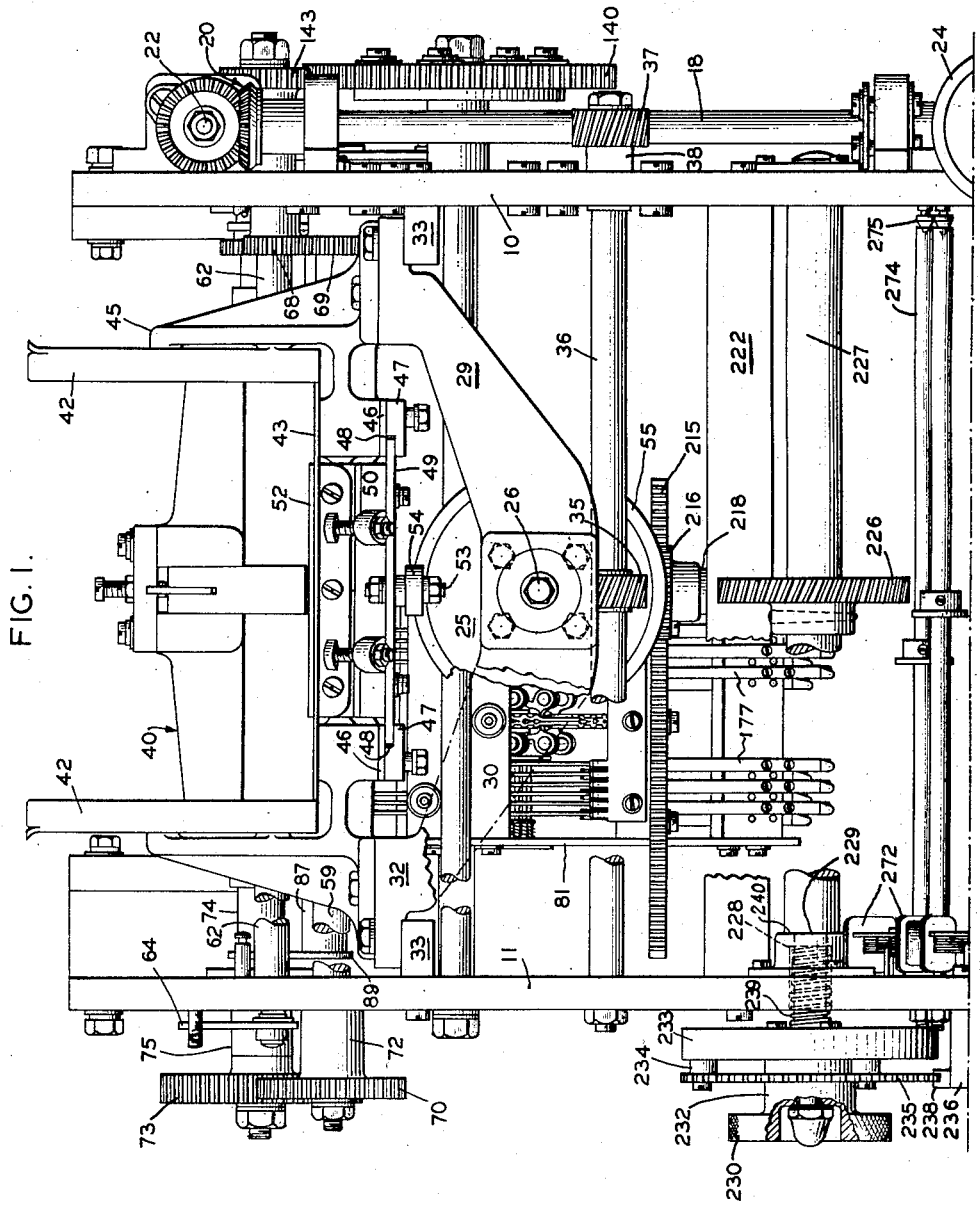
Figure 2:
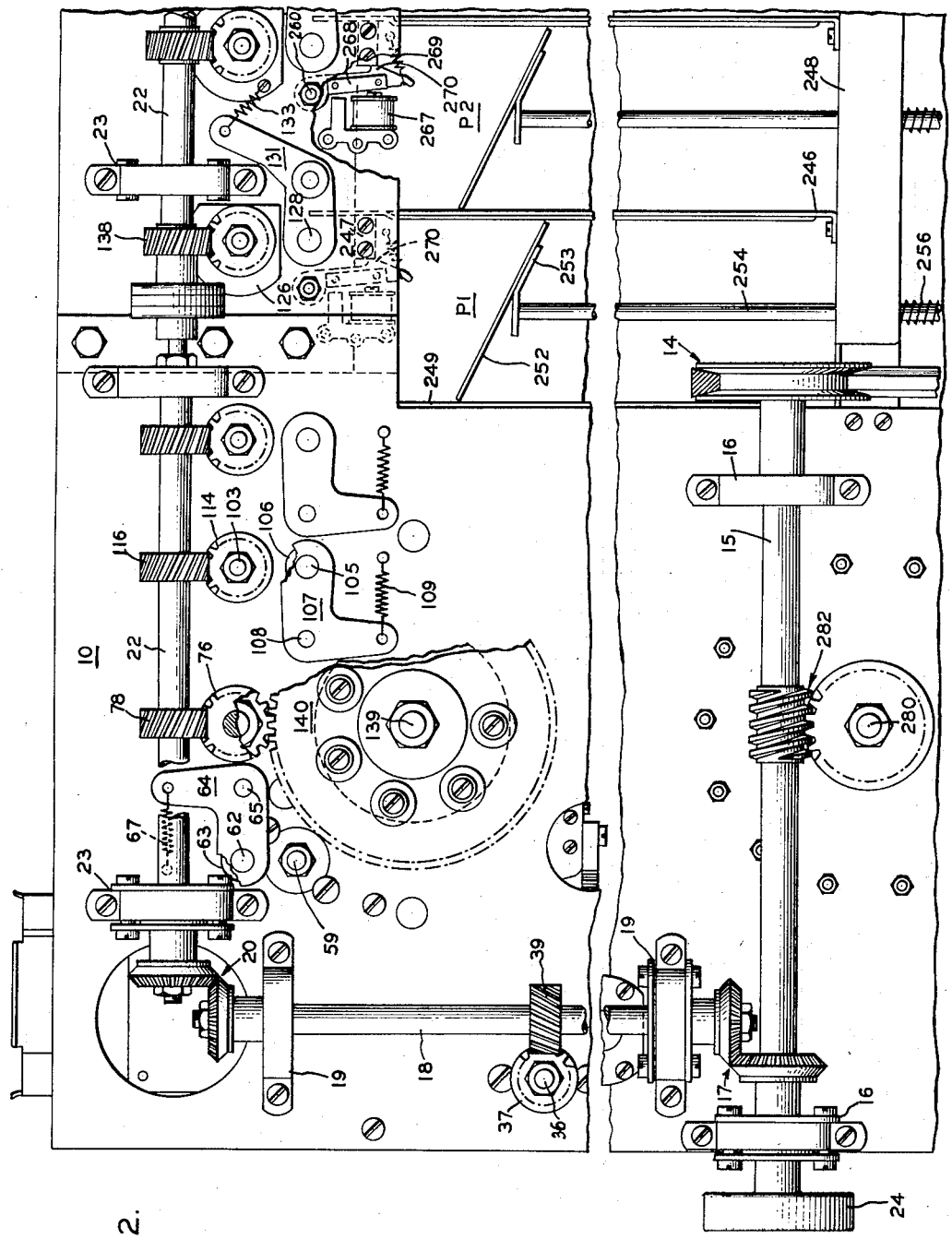
Figure 3:
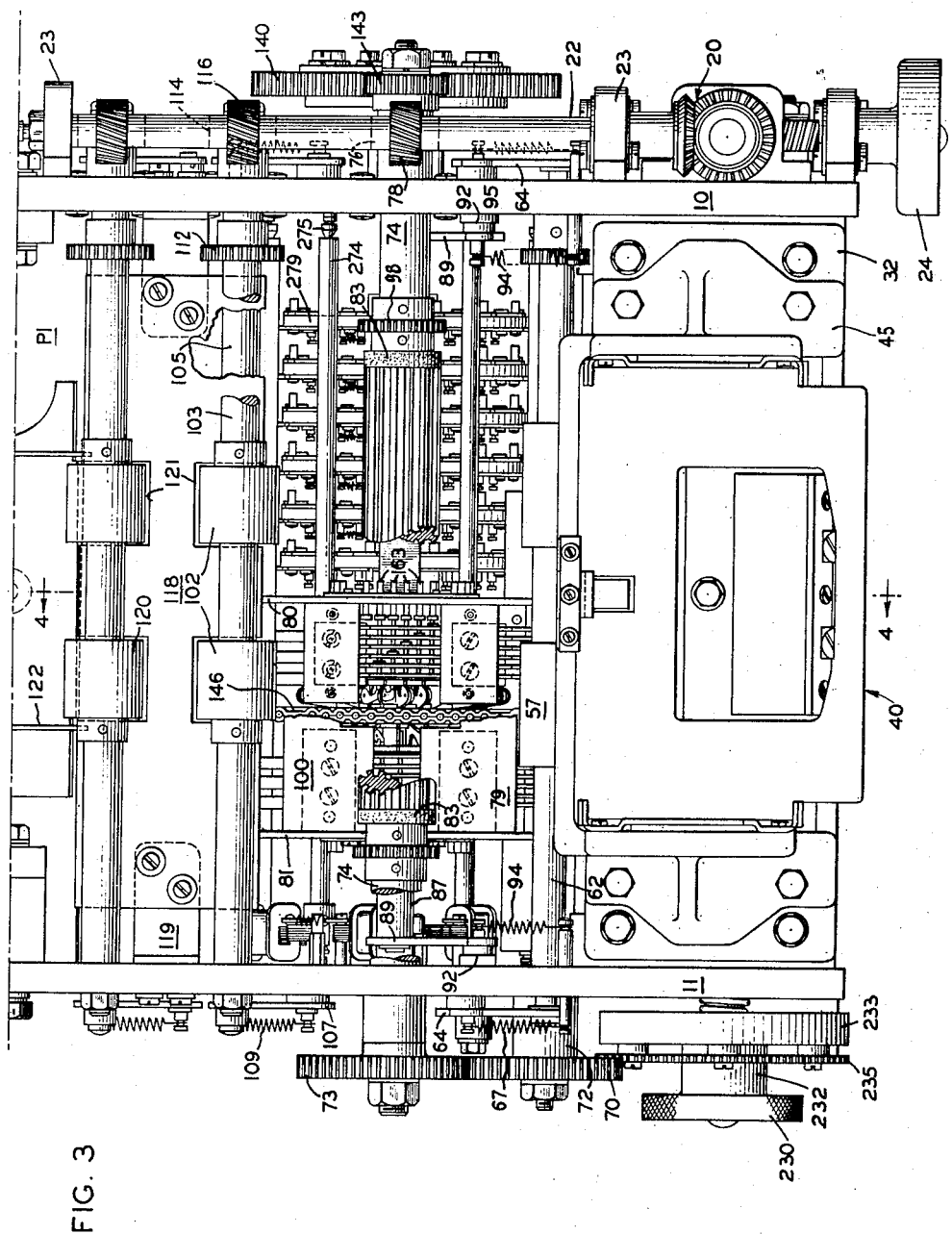
Figure 4:
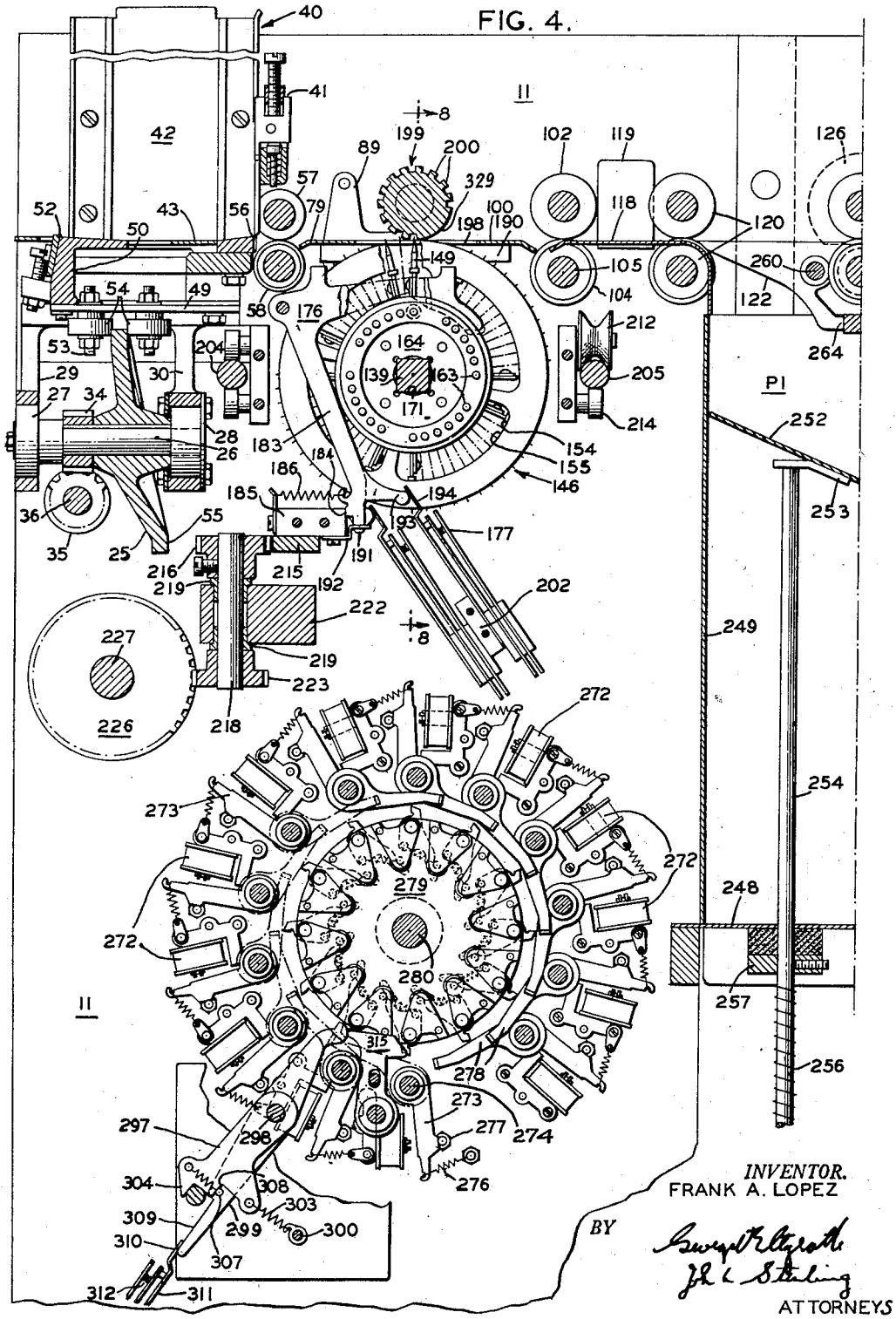
Figure 5:
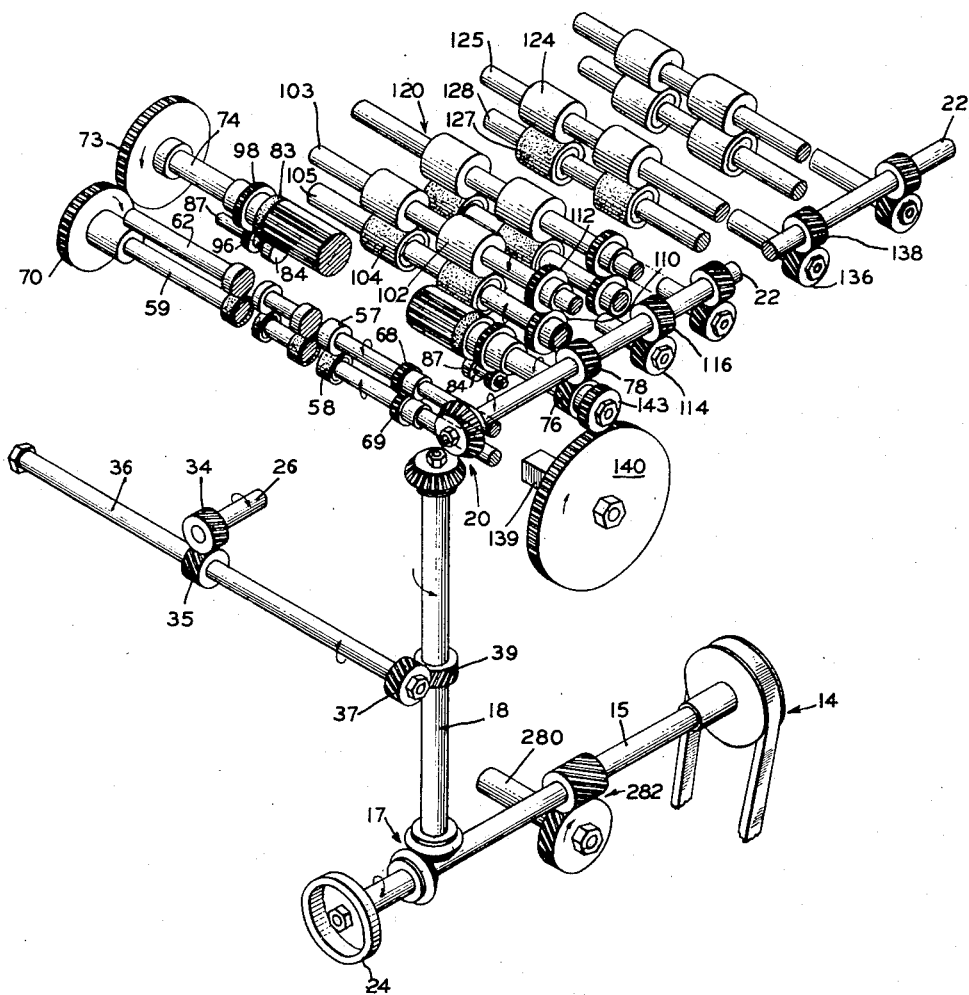
Fig. 5 is a schematic view of the drive system.
Figure 6:
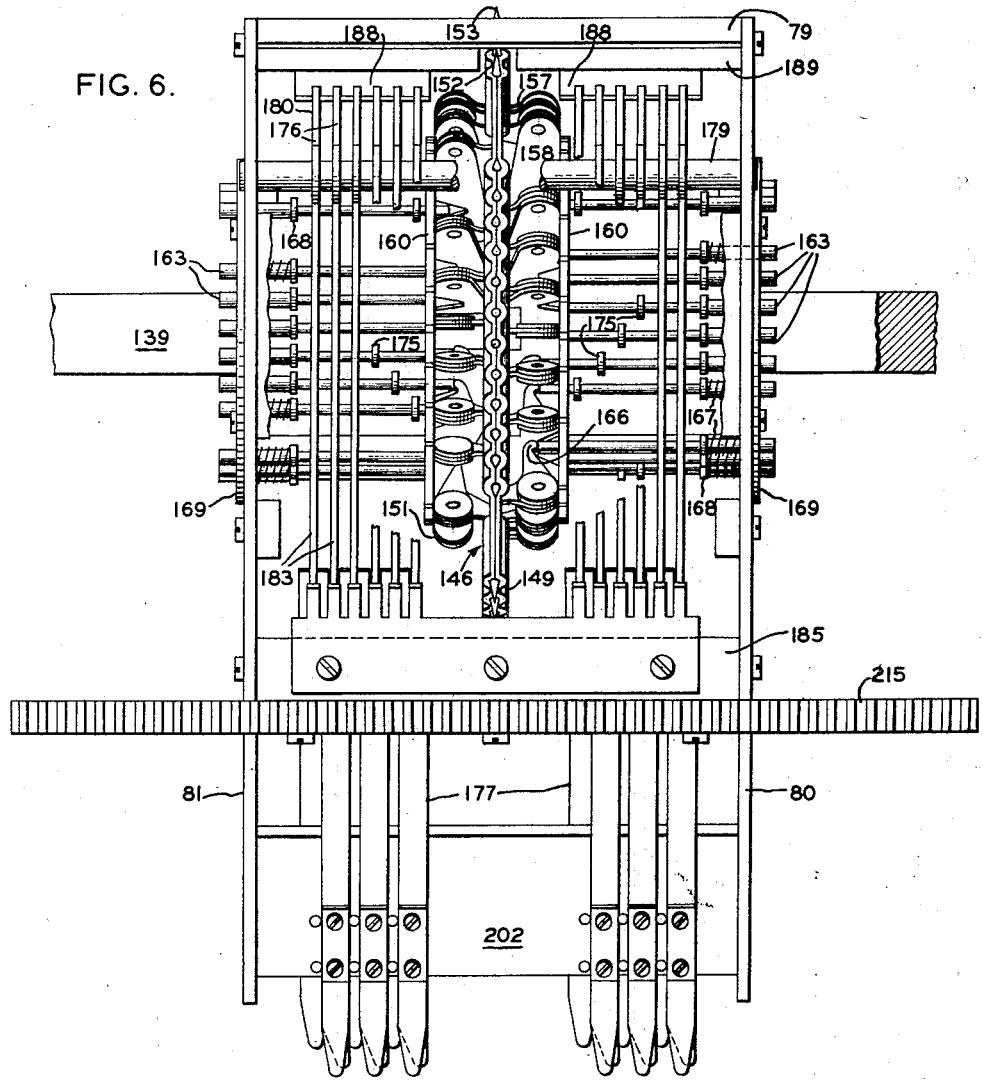
Fig. 6 is a front elevational view of the sensing head.
Figure 7:
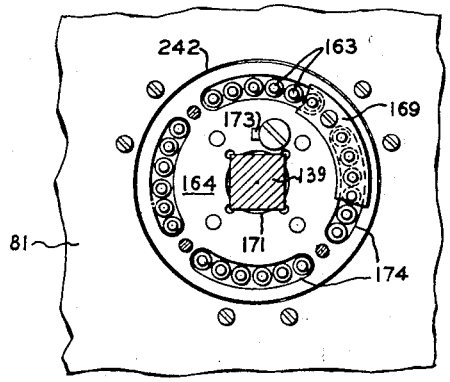
Fig. 7 is a fragmentary end view of Fig. 6 at a slightly smaller scale.
Figure 13:
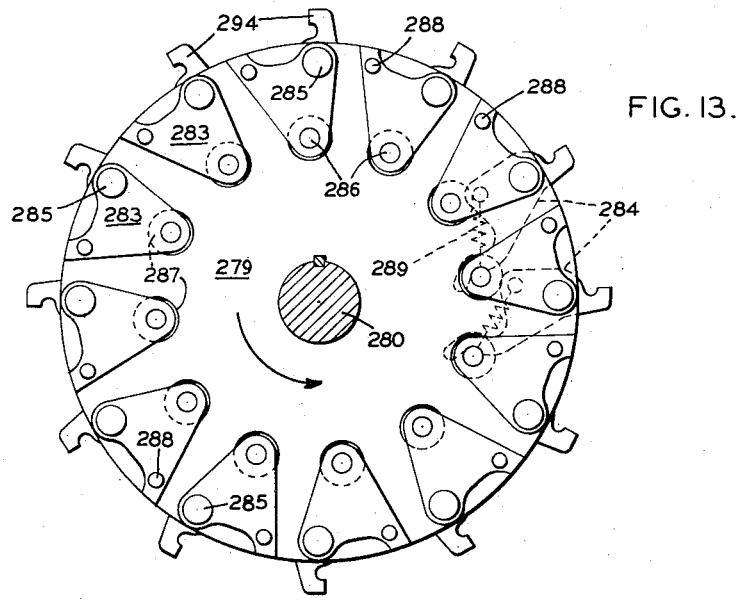
Fig. 13 is a detail of one side of a timing disc plate.
Figure 14:
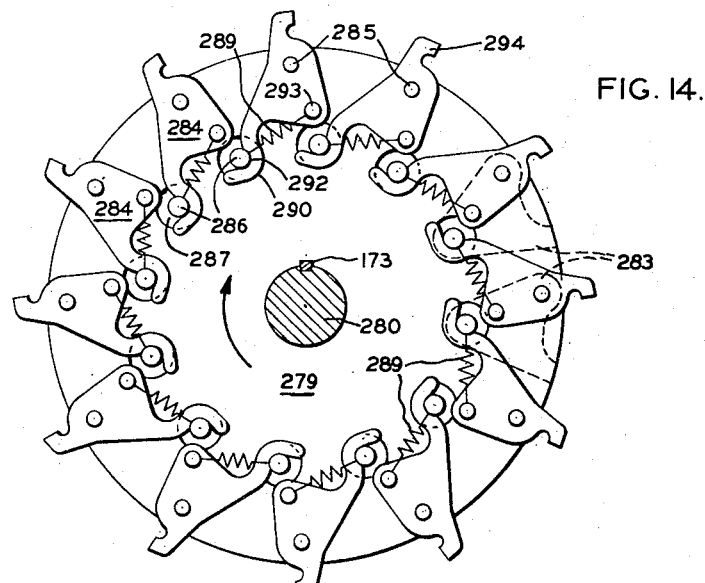
Fig. 14 is a detail of the other side of the timing disc plate.

In each group there are twelve individual pins, this being the number of index points in a column of the statistical card used. Each group of pins is equally spaced from the other and there are four groups of pins as indicated in Fig. 4, disposed about the disc member enabling four cards to be sensed with each revolution of the disc member 146. Each pin in a group is representative of a particular card index point, and the similarly positioned pin in each group is representative of the same index point.

In normal position each pin is pressed outward so that the sensing end or point 153 of the pin extends out beyond the peripheral edge of the disc member and is limited in the extent of its outward movement by a head 154 on its lower end. The head of each pin projects into and is adapted to limit against the upper edge 155 of an enlarged arcuate slot 156. There are four such slots in the disc member spaced equally apart, each slot being below and common to a group of pins.

The heads 154 of the several pins rest upon arms 157 of a series of bell crank members 151, which are pivoted at their apexes 158 to a series of supporting plates 159. For each sensing pin there is an individual bell crank pivoted to its individual supporting plate. The arrangement is such that the head of every other pin is supported by the arm of a bell crank pivoted to a supporting plate immediately to the right of the sensing disc member, and the others, by bell cranks pivoted to supporting plates to the left.

The supporting plates 159 are arranged in ring formation. Those to the left of the disc members 146 are supported in upright position between two disc elements 160, 161, while those to the right are carried in similar manner between similar disc members. Members 161 are mounted one to each side of the disc member 146. Members 160 are secured to the square shaft bearing 145 and are separated from the disc member 146 by spacers 162.

The arms 157 of the several bell cranks in normal position are held pressed against the sensing pin heads by a series of spring pressed plunger rods 163. These rods are carried in two groups in ring formation and for horizontal projectable movement, one group between a set of circular members 164, 160, secured on the square shaft bearing to the left of the sensing disc member 146, and the other, between a similar set of circular members 164, 160 to the right of the disc member. Those rods 163 located to the left are adapted to cooperate with those bell cranks 151 pivoted to the left of sensing disc member 146, and those to the right serve the bell cranks pivoted on the right.

For each sensing pin there is a separate plunger rod 163. The inner end of each plunger rod abuts against the other arm 166 of a bell crank member 151. Springs 167 are compressed upon the outer portions of the rods between stops 168 and retainer rings 169. The latter are secured to the outer face of the disc plates 164. Each plunger rod is constantly pressed by its spring 167 inwardly against the other arm 166 of its respective bell crank causing the bell crank to be turned upon its pivot, whereby each arm 157 is constantly pressed against the head of its respective sensing pin and urging the pin outwardly to its extended position.

The outer ends of the several plunger rods 163 are slidably carried in a ring of holes 170 in the retainer rings 169, while the inner ends of the rods are slidably carried in a ring of holes in the inner disc elements 160 previously mentioned. Suitable spacers 172 separate the supporting disc members 160, 164 between which the rods 163 are projectable.

The square shaft bearing 145 and the several elements mounted upon it are locked together in suitable manner as a unit. For this purpose a common key 173 serves in keeping the several parts of the sensing unit together.

As previously stated, the sensing unit is mounted on the square shaft 139 for rotation with it, as well as for adjustable slidable movement along it. To permit this sliding movement, the end disc plates 164 are provided with precise openings 171 through which the square shaft freely passes.

It is to be noted that the end disc plates 164 are provided with a series of enlarged slots 174 through which the outer ends of the plunger rods pass to be carried by the retainer rings 169. There are four such slots about each disc plate, and each slot is common to a separate group of six plunger rods. The slots are of a sufficient size to permit, if desired, upon removal of retainer rings 169, removal of the plunger rods for repairs or otherwise.

Upon each plunger rod is a cam 175, and each cam is aligned for actuation of a bell crank or contact closing element 176. Actuation of a bell crank 176 serves to effect the closing of a related electrical spring contact 177.

Contact closing elements 176 are pivoted at their apexes 178 upon a cross shaft 179 that is fixed between the upper portion of the frame plates 80, 81 of the sensing unit carriage. They are arranged in two groups, a group of six closing elements serves the cams of those plunger rods located to the left of the sensing disc member 146, another group of six serves those to the right. Each element 176 is representative of one of the twelve card index points and consequently serves the cams 175 of those four plunger rods 163 representative of the same card index point in each group of sensing pins.

Each bell crank 176 has an upper rearwardly extending arm 180 provided with an arcuate portion 182 which overhangs and is in alignment with the orbit or path of movement of its related cams 175. An arm 183 of each bell crank member depends downwardly and is provided on its lower forward portion with a heel 184 which limits against a common crossbar 185 fixed between the lower portion of the sensing unit carriage frame plates 80, 81. Springs 186 serve to tension these heels against crossbar 185, and as limited, the heels serve to maintain the upper arms 180 in a proper overhanging position in the path of their related cams 175.

The several bell-cranks 176 are guided in their pivotal movement by suitable combs. Their upper arms are guided fore and aft by extensions 187 slidable between the teeth of combs 188 fixed to the underside of crossbars 189, 190 while their lower arms are guided by extensions 191 slidable between the teeth of combs 192 fixed to the underside of the crossbar 185.

A toe 193 on each lower arm 183 abuts against an extended portion 194 of a leaf spring member and serves to close an associated electrical spring contact 177.

The arrangement is such, that as the sensing unit is carried around with the rotation of its square shaft and as cards are conveyed over the sensing head, sensing takes place. When a sensing pin 149 finds a card perforation the pin passes through it without affecting its own normal position. The cam 175 of the related plunger rod remains in the path of its associated contact closing member 176 and, upon coming into contact with a butt 196 of an arcuate portion 182 of its related upper contact closing arm 180, cams the arm upward and keeps it upward for the time that it rides the arcuate section 182 to effect the closing of a related electrical contact 177 through the consequent rearward movement of toe 193.

In those cases where a sensing pin does not find a card perforation, the pin is forced radially inward by the card's firm undersurface as in Fig. 11. This action pivots a related bell crank 151 to press its lower arm 166 against an associated plunger rod 163 and to project the rod horizontally against the tension of its spring 167. This action serves to carry the cam 175 of the projected rod to an ineffective position out of alignment with the overhanging contact closing member 176.

When the sensing head is carried about with the rotation of its square shaft only the pin points 153 of the sensing head are carried above the horizontal plane of the travelling card to permit penetration through the card perforations. To avoid any interference in this respect, the overhanging card guide plates 79, 100 are provided with suitable slots 198.

So as to keep the card firm during the sensing operation the upper cross shaft 74, which cooperates in the driving of the sensing head shaft 139, is provided with a splined portion 199. Upon penetration of a card the sensing pin point passes into one of the splines or slots. The spline ribs 200 to either side of the received sensing pin in cooperation with the peripheral shoulder 152 of the disc member 146 about the pin, serve to firm both sides of the card about the card perforation to allow sensing without card distortion.

The electrical contacts 177, closable by the several bell crank members 176 are fixed upon a cross bar 202 that is fast between the lowermost portions of the sensing unit carriage side plates 80, 81. There are twelve electrical contacts 177, one for each bell crank element 176, and each represents a card index point. The contacts are positioned in a group of six to be affected by those bellcrank members 176 to the left of the sensing disc member, and another six to accommodate the bell crank members to the right. In each group three electrical contacts 177 are fixed to the forward face of the cross bar 202 and three to the rear. Because of the further distances rearward of those electrical contacts to the rear, the toes 193 of those bell cranks 176 effecting these contacts are more extended than those affecting the forwardly positioned contacts as indicated in Fig. 4.

Closing of the various electrical contacts creates sensing circuits, one of which is eventually elicited by a decoding system and transferred to a timing system fully detailed later on, which controls the time of opening of the proper card receiving pocket.

COLUMN SPACING OF THE SENSING HEAD
Figs. 1, 4, 8, 16

As previously mentioned the sensing head is adapted for adjustable sliding movement along the square cross shaft 139 to any selected card column position. The particular card column that is to be subjected to the sensing and sorting operation is determined and selected before any operation of the machine takes place. Suitable carriage mechanism is provided for this purpose, whereby the sensing unit may be moved to any desired card column position and there held until it is again desired to adjust the sensing head to a new column position.

The carriage includes a frame comprising a pair of right and left vertical plates 80, 81, mentioned earlier. These plates extend rearwardly of the machine and are held in spaced relation from one another by various cross members secured between them. Secured between the lowermost portions of the carriage plates is the support bar 202 on which is carried the several sensing spring contact members 177. Between the carriage plates at the upper forward portion is carried the cross shaft 179 on which are pivoted the several contact closing elements 176. Between the top portions of the carriage plates are the comb bearing cross bars 189, 190.

The carriage is adapted to move back and forth crosswise of the machine and is provided with suitable rollers, adapted to carry it for this purpose, on a pair of cross shafts or tracks 204, 205 which are fixed at their ends in the right and left frame plates 10, 11 of the machine. The rollers are carried upon a pair of cross bars 207, 208. Cross bar 207 is fixed between the forward parts of the carriage plates and carries on its outer face two upper plain rollers 209 adapted to ride along the top of rail 204, and a lower plain roller 210 adapted to roll against the lower portion of the rail. Cross bar 208 fixed between the rearward parts of the carriage plates carries on its rearward face a pair of grooved rollers 212 adapted to ride atop the rear rail 205, and a plain roller 214 adapted to roll against the bottom of the rail. By this arrangement of rollers the carriage can be accurately guided and moved along its rails.

The adjustment or movement of the carriage along the rails is performed manually through suitable indexing means and gearing associated with the carriage. For this purpose there is secured to the undersurface of the carriage crossbar 185 an elongated rack 215, the teeth of which are contained upon its forward face and are in constant mesh with a gear 216. The latter gear is secured on the upper end of a short vertical shaft 218. The latter shaft is carried for rotatable movement in a pair of suitable bearings 219, contained in a supporting cross beam 222 secured between the machines right and left frame plates. Secured on the lower end of the vertical shaft 218, which end projects through the cross beam 222, is another gear 223.

Gear 223 is in constant mesh with a larger gear 226 securely carried upon a cross shaft 227, which shaft is suitably carried at its ends in the right and left frame plates of the machine and is adapted for slight lateral slidable movement. The right end of shaft 227 projects slightly through the machine frame. A portion of the shaft at its left end is narrower in diameter than the major portion of the shaft. This reduced portion 228 extends through a cup bearing 229, that is secured to the inner wall of the left frame plate 11, and the reduced portion projects substantially beyond the left side of the frame plate. Fast on the left end of shaft 227 is a hand wheel 230, the turning of which is adapted to rotate shaft 227. Secured to the inner face of a hub 232 of the hand wheel is a large supporting disc 233 preferably of light weight material. About the outer left face of this disc are studs 234 on which is mounted an indexing gear ring 235. The studs serve to space the index ring slightly from the supporting disc 233. Fast upon a block 236 projecting from the outer side of the left frame plate is mounted an ear which normally engages the teeth of ring 235 and thereby prevents the cross shaft 227 from rotating until released.

A compression spring 239 serves to tension shaft 227 to its extreme leftward position where it is limited by a shoulder 240 abutting against the outer face of the cup bearing 229. In this position the index ring 235 is latched by the ear 238.

The arrangement is such that when it is desired to adjust the column position of the sensing head, hand wheel 230 is pressed inwardly forcing shaft 227 laterally against the tension of spring 239 and carrying the index ring 235 free of its latch 238. During this brief movement of shaft 227, its gear 226 is carried with it, but the gear continues to remain in mesh with the wider gear 223. Free of the latch, the hand wheel may be turned either to the right or to the left to effect through the related gearing and rack 215 a movement of the carriage along its rails either to the right or to the left as desired. Each tooth of the index ring 235 represents a card column space.

Movement of the carriage to the right or left effects a corresponding movement of the sensing unit, which is slidable upon the cross shaft and is confined between the carriage frame plates 80, 81. The carriage frame plates are each provided for this purpose with an enlarged circular opening 242 axially of which the square shaft 139 passes. The carriage frame plates are spaced apart from one another a distance corresponding to that between the two outside disc plates 164 of the sensing unit. The arrangement is such that the outer disc plates 164 of the sensing head are freely received in the enlarged openings of the carriage frame plates, the openings 242 being of sufficient diameter as not to interfere with the free rotation of the sensing unit. Fixed to the inner walls of each carriage plate are three bearing blocks 243 equally spaced from one another about the enlarged openings. The arrangement is such that the outer disc plates 164 of the sensing head are confined by the bearing blocks in the openings 242 of the carriage frame plates, so that, when the carriage is moved to the right the bearing blocks on the right frame plate abut against the outer right sensing unit disc plate 164 and bear the sensing head to the right with the carriage; and when the carriage is moved to the left, the bearing blocks on the left side bear the sensing head to the left in similar manner.

It is to be noted that movement of the carriage frame carries with it the sensing contacts 177 and the contact closing elements 176. These, as previously mentioned, are in fixed position on their respective cross members between the carriage frame plates. The arrangement is such that the carriage and associated sensing head move as a unit, so that the several plunger rod cams 175 of the sensing unit remain at all times in co-planar alignment with their respective contact closing elements 176.

It is to be noted that the carriage frame plates are each provided with a valley or notched portion 244 in their upper top portions. The purpose of this is to allow lateral movement of the carriage clear of and without interference with the lower conveying roller elements 84 of the stub shafts 87 previously described.

THE CARD POCKETS
Figs. 2, 3, 3A, 4, 4A

After the cards have passed over the sensing head they are carried by the conveying system to their respective pockets. There are fourteen card receiving pockets, P1–P13 and RP, the last of which RP at the rear of the machine is the reject pocket adapted to receive those cards not sensed.

The pockets are of suitable construction and are located in successive order, the one following the other progressively toward the rear of the machine. It is to be noted in the drawings, Figs. 3A, 4A, that the central portion of the machine is broken away, it not being thought necessary to show all of the pockets inasmuch as those pockets shown suffice for the description. For best results the distance between each pocket is 3.25 inches or a full card width. Each pocket is partitioned from the one before it by suitable vertical partitioning walls or brackets 246 properly secured to the machine framework. Brackets 246 are secured at their upper ends to suitable cross bars 247 of the framing, and are mounted at their lower ends upon a floor plate 248 which is common to the several pockets and is secured in the framing about midway of the height of the machine. The first and last pockets are also provided respectively with a forward wall 249 and a rear wall 250 suitably secured in the framework. The pockets are open at the right and left sides to permit access for removal of the cards.

In each pocket there is provided a card landing shell 252 disposed upon a bracket 253 in a position inclined downwardly and rearwardly. The angle of inclination is intended for best card stacking results to approximate that angle of descent taken by a card as it is carried into the pocket. Bracket 253 is carried atop a vertically disposed rod 254, which rod is adapted for vertical slidable movement and is guided for such movement by suitable holes in the floor plate 248 as well as holes in a lower horizontally disposed base plate 255. Rod 254 is supported in a proper elevated position by a compression spring 256. The arrangement is such that each card as it enters a pocket does so at an angle and drops in orderly manner upon the card shelf. The weight of the piling cards forces the shelf downward compressing the spring 256. Upon removal of the cards the shelf automatically springs back to its normally raised position.

The elevated position of the shelf is limited by a stop 257 carried upon the rod and adapted to limit against the underside of the floor plate 248. The height of the shelf may be adjusted up or down by an adjusting screw 258 for best card receiving results, so as to insure proper card piling. A resilient portion 259, such as rubber, is provided on the upper surface of stop 257 to eliminate noise and banging that would otherwise occur upon the springing of the card shelf to normal position following removal of the stacked cards.

Each pocket is provided with a pair of arms or shutters 122 fixed upon its individual cross shaft 260. Each cross shaft 260 is carried at its ends for pivotal movement upon adjustable screw pivot pins 262 carried in the right and left machine frame plates. The rear ends of the shutter arms are fixed to their respective cross shafts, while their free ends 263 extend forwardly of the machine across the pocket openings. In lowered or closed position the surfaces of the shutter arms are in a position closing the pocket opening and presenting a level upper surface allowing a free and smooth movement of cards travelling over them. This level position of the shutter arms is insured by a heel 264 of each arm that limits against its individual cross bar 247.

In open position the arms are inclined slightly upward, whereby the moving cards pass under the free ends 263 and are carried into the pocket. The undersurfaces 266 of the arms are arcuate. This allows for an inclined and gradual carriage of the card into the pocket, thereby further facilitating the stacking of the cards.

Arms 122 are normally in a position closing their pockets, and are raised to an open position through the action of electromagnets 267. There is an electromagnet 267 associated with each pocket, except the reject pocket the shutters 122 of which are always open, and is mounted along the inner right side of the framing 10. Each magnet is provided with an armature 268 properly fixed at one end to a shutter cross shaft 260. Energization of the magnet attracts the free end of the armature against the tension of a spring 269 causing shaft 260 to pivot and raise its shutter arms sufficiently to permit entrance of cards to the pocket. The shutter arms are released to normal position by tension of the spring 269 upon deenergization of the magnet, whereupon the armature is tensioned rearwardly and limited by its heel 270 against the cross bar 247.

The pocket magnets are energized by the closing of electrical contacts through the action of timing disc magnets associated with a timing mechanism.

TIMING MECHANISM
Figs. 1, 1A, 2, 4, 10, 13–15

Suitable timing mechanism is provided in the machine. The timing mechanism includes a plurality of electromagnets 272 each responsive to a circuit elicited by a decoding unit from one or more circuits created by closing of the sensing contacts 177. The decoding unit described later herein, analyzes or translates the circuits created with the sensing of each card and elicits a single circuit. This elicited circuit energizes one of the timing disc magnets 272 to cause through mechanical means, as timing discs, the closing of one of a series of electrical contacts. This action results in the energization of a related pocket magnet and the consequent opening of an associated card pocket, previously described, in time to receive the sensed card.

There is provided a series of timing disc magnets 272, thirteen in all, each related to a particular card pocket. The magnets are mounted in ring formation about the inner wall of the left framing 11 of the machine. Each magnet is provided with an armature 273 fixed upon a separate cross shaft 274. The several cross shafts 274 are also in ring formation. Each cross shaft 274 is carried for pivotal movement at its ends on adjustable screw pivot pins 275 in the right and left frame plates. In normal position the several arm atures 273 are tensioned, as in Fig. 4, counter-clockwise and slightly away from their related magnets by springs 276, and are limited in this position against studs 277 fixed to the left framing 11.

Fixed upon each cross shaft 274 is a timing disc set-up key arm 278, and associated with each key arm is a separate timing disc member 279.

The several timing disc members 279, thirteen in all, comprising actuating means for the associated pockets, each representative of a particular card pocket, are axially mounted fast in proper lateral spaced relation to one another upon a cross shaft 280 and are adapted to be carried about with the rotation of the shaft. Shaft 280 is carried at its ends in the right and left frames of the machine for continuous rotatable movement, and derives its motion through suitable gearing 282, connecting it to the lower drive shaft 15. The latter is continuously in motion during the operation of the machine. The gear ratios are such that the timing disc unit will make one revolution to twelve of the feed cam wheel 25.

The timing discs are provided with a series of trip pawls 283 and associated retract latches 284. The arrangement is such that actuation of a timing disc magnet serves to set up one of the trip pawls. As will be shortly described, this set-up pawl is carried about by its disc member and causes the closing of a related electrical contact and consequent energization of a pocket magnet to effect the opening of an associated pocket in time to receive an approaching card. The latches and pawls in cooperation with suitable camming mechanism are then subsequently reset to normal position.

An annular series of the trip pawls 283 are carried for pivotal movement on one side of each disc plate 279. Here they are spaced equally apart on the right side and are twelve in number, that being the number by which the best results are obtainable. The pawls are substantially triangular and each pivots at its apex upon one of an annular series of studs 285 which extend out from both sides of the disc plate. Projecting leftward from one corner of each pawl is a pin 286. Each pin 286 plays in and projects through an enlarged hole 287 and extends slightly beyond the left side of the disc plate. Projecting laterally to the right from the third corner of the pawl is a trip pin 288 adapted for tripping linkage that will effect the closing of a related electrical contact. Normally, pawls 283 are held in a position whereby the projecting trip pins 288 are unable to effect the closing of their related electrical contacts, as in Figs. 4, 13. They are held latched in this disabled position through the action of a series of retract latches 284 and springs 289. Each latch, there being one associated with each pawl, pivots on the reverse side of the disc plate upon the extended left end of a pawl pivot stud 285. Each latch controls the position of the pawl to the rear of the pawl to which it is pivoted, Figs. 4, 10, 14. A tail 290 of each latch has a step 292 in which is contained the projecting pin 286 of the pawl it controls. A spring 289 hooked at one end to a pawl pin 286 and at the other end to a latch pin 293 of the related latch serves to draw the pawl pin into the step 292 of the latch and to thereby restrain the pawl in a counter-clockwise ineffective position.

Each latch is provided with an elevated extension 294. A pawl is releasable to effective tripping position whenever the extension 294 of its related latch comes in collision with an actuated or lowered key arm 278.

Figure 15:
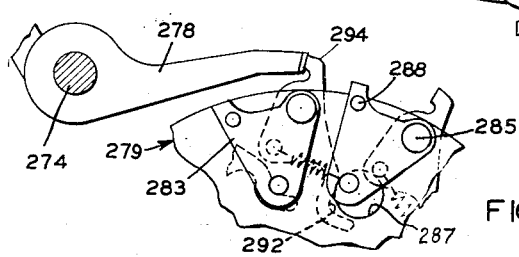
Fig. 15 illustrates a timing disc latch in contact with its upsetting arm and showing the resultant elevated position of the released pawl.
Figure 16:
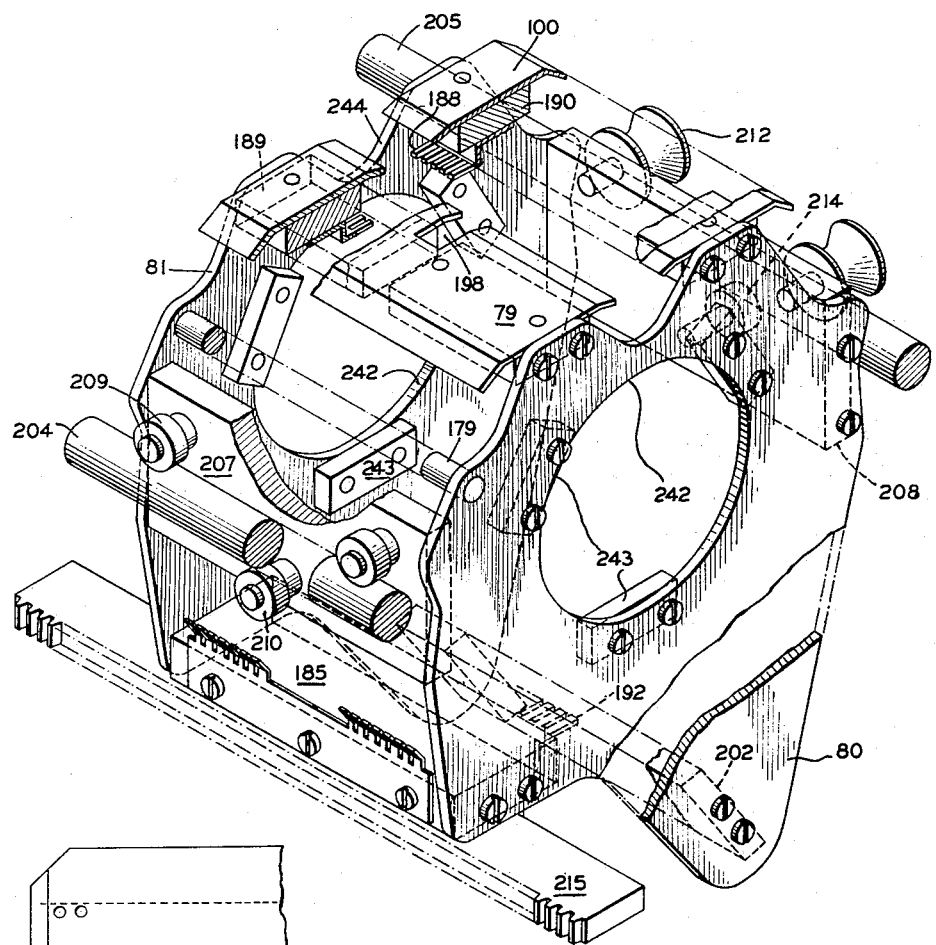
Fig. 16 is a detail of the sensing head carriage.

The arrangement is such that upon the analysis of a perforated card, an impulse is transmitted to momentarily energize a timing disc magnet 272. The magnet attracts its armature against the tension of its spring and effects the momentary lowering of its related key arm 278 into the path of the first elevated latch extension 294 it meets of a related revolving timing disc 279. The key 278 collides with the extension 294 forcing it clockwise whereby the latch tail 290 is drawn away from its related pawl pin 286, and the related pawl is at the same time spring drawn clockwise to raise its pin 288 upwards to effective tripping position. The effected pawl is limited in its clockwise movement by its pin 286 limiting against the side of the enlarged hole 287. The key arm action is temporary; it slides off the latch extension 294 and rises to normal position upon the deenergization of its magnet and before it can collide with the next on-coming latch extension 294. The extended pin 286 of the actuated pawl is limited against the side of hole 287, and its trip pin 288 is held raised by its related spring in its effective position as indicated in Fig. 15.

The elevated pin 288 on the actuated pawl is then carried around with the counter-clockwise rotation of its disc member until it strikes a nose 296 of an arm 297 to effect the closing of a related electrical contact and the opening of an associated card pocket. The distance a pawl is carried from the time it is set up to the time it effects the closing of its related electrical contact determines the distance a card must travel to approach its destined pocket.

The arrangement of the timing disc pawls 283 and the set up key arms 278 is such that each key arm is located to set up a pawl on a related timing disc 279 at a set number of degrees away from the point of contact of the set-up pawl with its related electrical contact closing arm 297. The number of degrees the set-up pawl is carried, before it contacts the nose of an arm 297, corresponds to the distance the sensed card travels from the time the corresponding timing disc key arm is actuated to a point approximately .125 inch distant before the mouth of its related pocket. From the time a nose of arm 297 is contacted and a pocket magnet is energized to open its pocket the card travels the .125 inch.

Each statistical card is 3.25 inches in width. This also is the distance between each of the card pockets. With each revolution of the main feed cam or each 1/12 or 30° revolution of the timing disc shaft a card is adapted to be conveyed a distance of 3.75 inches.

In all cases regardless of which pocket is to be affected a sensed card will have been carried to a point .625 inch in front of the number one pocket when a pawl on any of the timing discs is set up by the key arm of its related timing disc magnet. Hence, in the case of a card destined for the number one pocket, the set-up pawl must travel a distance of 4° before contacting the nose of arm 297. 4° travel of the pawl corresponds to .50 inch travel of the card. The card travels another .125 inch before the pocket actually opens.

To cover the additional 3.25 inches that a card must travel to reach the number 2 pocket, a pawl related to this pocket must travel an additional 26°, and so on with each successive pocket 26° is added to the traveling distance of the affected pawl.

To effect this relation of the timing disc pawls and the set up key arms, each key arm is of equal length and each key armshaft is spaced from its neighbor a distance of 26° with a distance of 48° between the 1st and 13th shafts. Each timing disc associated with each arm is adjusted in position so that when its related key arm is affected a pawl will be set up the required number of degrees it must travel to actuate its related contact closing arm 297.

There are thirteen arms 297, one associated for action with each disc member 279. These are properly spaced from one another and are pivoted on a common cross shaft 298. Each arm is associated with a separate contact finger 299 also pivoted on the shaft 298. Fixed upon another common cross shaft 300 is a series of spring hooks 302, one of which is associated with each contact arm 297. Each hook carries a spring 303 whereby its related arm 297, as in Fig. 10, is tensioned counterclockwise. Arms 297 are limited in their counter-clockwise position by tails 304 limiting against a common cross shaft 305.

A spring 306 hooked at one end to a pin 307 of finger 299 and at the other to the tail 304 of the related arm 297 tensions the finger 299 clockwise where it limits against a shoulder 308 of arm 297, whereby the tip 309 of the finger is restrained from exerting pressure upon an extended portion 310 of a leaf spring 311.

There are a series of leaf springs 311, one for each finger 299, and each is associated in suitable manner with a pair of conventional leaf spring contacts 312 carried upon a cross bar 314.

The arrangement is such that upon an elevated pawl trip pin 288 of a disc member coming in contact with the nose 296 of an associated contact arm 297, the contact arm is forced on its pivot clockwise drawing its tail end away from its limiting shaft and against the tension of its spring 303. This action tensions the spring 306 and draws the finger tip 309 clockwise to move the extended leaf spring 310 to effect closing of related electrical contacts 312 and the consequent energization of a related pocket magnet.

With this clockwise movement of contact arm 297, the elevated pawl pin 288 escapes the upper nose 296 of the arm. The pawl pin is further carried around with the revolving disc plate 279 and is then reset to normal position through the action of a camming plate 315.

There are a series of cam plates 315, one associated with each disc member 279 and carried fast upon a common cross shaft 316 in proper spaced relation to one another. The several cam plates 315 are held in alignment with one another by a second common cross shaft 317 through a suitable opening 318 in the shank of each plate.

The nature of each cam plate 315 is such that, as an actuated or elevated pawl pin 288 is carried about with its disc plate and after the pin escapes the contact arm nose 296, the elevated pawl pin 288 contacts and passes over a cam surface 320 of its associated cam plate 315 whereby the pawl 283 is forced inward. This action pivots the pawl counter-clockwise and forces its pin 286 against the tension of its spring 289 away from the latch 295, whereupon tension of the spring 289 draws the tail 290 of the latch upwards so as to latch the pawl pin 286, in its ineffective or normal position in the tail step 292.

Figure 17:
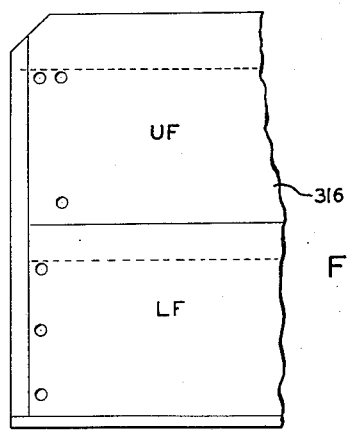
Fig. 17 is a fragment of a record card.

RECORD CARDS
*Figs. 17, 18, 18A*

As previously stated the effect of closing the electrical contacts 312 associated with a timing disc plate is to energize a related pocket magnet and to effect the opening of a pocket for reception of the sensed card.

The particular timing disc plate to be actuated and the particular pocket to be opened is primarily determined by the particular index points perforated in the statistical card passing through the machine. Suitable decoding means, hereinafter described, is provided to select a single electrical circuit from the one or more circuits initiated in the sensing of a card and to transmit that circuit to the proper timing disc plate, which plate in turn, will at the proper time bring about the opening of the proper card pocket.

The machine is designed to sort the type of statistical cards used with tabulating and accounting machines. It is particularly adapted for use with a conventional 90 column card 316 employing the well known six point alpha-numerical combination code and having an upper and a lower field UF, LF. The numeric characters 0–9 shown by representive punchings or perforations in the upper field and the alpha characters A–Z shown by a representative punching in the lower field may be recorded in either field of the card.

A manual field switch FS is provided in the wiring circuit whereby the operator may select either the upper or lower card field for sensing and sorting of a batch of cards. Where a card contains perforations in both fields, only those perforations in the field selected are effectively sensed. On the next sorting run of the machine the card may be sensed for those perforations in the other field. A card not containing any perforations, or not having perforations in the selected field, is not sensed and is carried off to the reject pocket to await further sorting operations.

During alphabetical sensing and sorting the first thirteen pockets Nos. P1–P13 (Figs. 4, 4A) receive those cards bearing alphabetical characters as indicated in the table below; during numerical sensing the pockets Nos. P1–10, respectively, receive cards bearing the numeric characters 0–9.

DISTRIBUTION TABLE

| Pocket | Alpha Cards | Numeric Cards |
|---|---|---|
| 1 | A, N | 0 |
| 2 | B, O | 1 |
| 3 | C, P | 2 |
| 4 | D, Q | 3 |
| 5 | E, R | 4 |
| 6 | F, S | 5 |
| 7 | G, T | 6 |
| 8 | H, U | 7 |
| 9 | I, V | 8 |
| 10 | J, W | 9 |
| 11 | K, X | |
| 12 | L, Y | |
| 13 | M, Z | |
| 14 | Rejects | Rejects |

There is provided in the wiring circuit suitable switching means for predetermining the distribution of the cards to the various pockets. A group of thirteen manually operated three-positional selector switches PSS is provided for this purpose. Each switch is associated with one of the thirteen pockets and predetermines the distribution of particular cards to that pocket.

CIRCUITS AND MACHINE OPERATION

The circuits involved in the operation of the machine may be best understood by reference to Figs. 18, 18A wherein there is disclosed the electrical diagram for the machine. In these figures the sensing contacts 177 and associated sensing relays have been labeled with sub-designations 0, 1, 3, 5, 7, 9, corresponding to related card index positions, and the selector switches PSS, timing disk magnets 272, timing disk contacts 312, and pocket magnets 267 have been labeled with sub-designations 1–13 corresponding to the related card pocket of the machine.

A suitable source of current supply is provided and indicated at CS, preferably 115 volts alternating current. The starting motor M which provides the motive power for the various drive shafts is hooked directly to the current supply. The decoding system and various electromagnets operate best on a reduced direct current. A step down transformer T, together with a suitable rectifier, such as a full wave rectifier R, supplies a suitable reduced and rectified current for this purpose, about 60 volts D. C.

A starting switch S serves to simultaneously permit current from the current supply to flow directly to the motor M, and also through the transformer and associated rectifier to a decoding system and associated electromagnets.

The decoding system comprises a group of six sensing relays in parallel and indicated R0, R1, R3, R5, R7, and R9. The statistical cards which the machine is adapted to sense and sort contain as previously mentioned in each column an upper field UF and a lower field LF, in each of which fields there are six index positions according to the six-point combinational code used. Each of the six sensing relays are in the order previously mentioned wired to the corresponding sensing contacts 177 in both fields, indicated in the wiring diagram as Upper Sensing Contacts 0, 1, 3, 5, 7, and 9, and as Lower Sensing Contacts 0, 1, 3, 5, 7, and 9.

There is also provided a series of normally open holding contacts HC0, HC1, HC3, HC5, HC7, and HC9, hooked to a common positive line 320 leading to the rectifier; there being one holding contact associated with each sensing relay and serving to insure or hold the energization of its related relay until a card has been fully sensed.

The field selector switch FS when turned upon an upper field contact UFC permits a current supply to the upper field sensing contacts, and when turned upon a lower field contact LFC permits a current supply to the lower field sensing contacts. When one field is so selected for sensing, no circuits are completed through any of the sensing contacts of the non-elected field, even though the non-elected field might contain index perforations permitting the mechanical closing of these sensing contacts during the sensing operation.

Each sensing relay controls the opening and closing of a group of Decoding Contacts 335 which have been labeled with subdesignations 1 through 72, the contacts 1 through 11, 23 through 33, 45 through 51, 59 through 62, 67, 68, and 71 being in the upper leg circuits, and the contacts 12 through 22, 34 through 44, 52 through 58, 63 through 66, 69, 70, and 72 being in the lower leg circuits of the respective switches. The several groups of decoding contacts are interrelated to one another in a wiring arrangement and serve to elicit from the closing of one or more sensing contacts a single circuit; and the arrangement is such, that a single circuit may be elicited for each of the numerical and alpha characters.

The several circuits that may be elicited are labeled and provided with terminals as indicated in the wiring diagram commencing with "zero" and ending with Z, and are in general called the decoding circuit terminals DCT.

A suitable switch panel, not shown, containing thirteen selector switches PSS is provided. All thirteen of the selector switches have two of their terminals, each labeled with alpha characters, and ten also have one of their terminals labeled with a numeric character, as indicated in the wiring diagram. The terminals of each selector switch are wired to the correspondingly labeled decoding circuit terminals DCT.

The main or arm terminal AT of each selector switch is wired to a separate one of the thirteen Timing Disc magnets 272. Each timing disc magnet when energized serves, in the manner previously described, to effect the closing of its associated timing disc contact 312, designated in the wiring diagram as Timing Disc Contacts 1-13, which are normally in open position. Associated with each of the timing disc contacts is one of the previously mentioned pocket magnets 267 herein the wiring diagram labeled Pocket Magnets 1-13. Closing of a timing disc contact serves to energize its related pocket magnet to effect the consequent opening of a related card receiving pocket.

The pocket magnets and their related timing disc contacts are respectively connected in parallel to the negative and positive sides of the rectifier R. A negative line 321 runs directly from the rectifier without interruption to the negative terminals of the pocket magnet coils. A positive line 322 runs directly to the timing disc contacts. Closing of a timing disc contact through action of a timing disc magnet, in the manner previously described, completes a circuit and effects the energization of a related pocket magnet.

A circuit elicited through the decoding system and a selector switch to the positive side of a timing disc magnet is not completed until a pair of normally open master timer spring contacts 323 in a negative line 325 is closed by a timing cam 324 operating off a suitable shaft, such as the spline shaft 74. The negative line 325 is common to the several timing disc magnets. The master timer contacts 323 are cammed closed upon completion of each sensing cycle of a card, and are held momentarily closed for the time required for the key arm 278 of the related energized timing disc magnet to set up a timing disc pawl 283, after which the master timer contacts spring back to open position. With the restoration of the timer contacts to normal position, a cam 326 also operating off a suitable shaft, such as the spline shaft 74, before the commencement of a new card cycle momentarily opens a pair of eraser spring contacts 327 in a negative line 328. This effects the deenergization of the sensing relays and restoration of all effected contacts to normal position.

After a card has been fully sensed the spline shaft 74 continues to rotate for an interval of time represented by the blank space 329 thereon. This lapse of time occurs before sensing of the next card begins. It is during this brief interval of time that decoding is completed and the action first with respect to the master timer, and then the eraser contacts occur.

With the restoration of the effected contacts to normal position a new card is carried into the sensing head and, while sensing and decoding goes on for this subsequent card, the card already sensed is being carried to its destined pocket.

During the travel of the sensed card to its pocket after leaving the sensing head, the timing disc pawl set up by the key arm and armature of its related magnet is carried about by its disc 279 and upon striking the arm 297 effects the energization of its related pocket magnet and the consequent opening of the associated pocket in time to receive the approaching sensed card.

In the operation of the machine certain preliminary steps are first taken. A stack of cards to be sorted is first placed in the magazine 40. If the cards are to be sensed for numerical characters the field selector switch FS is manually turned upon the upper field contact UFC. Each three position selector switch PSS containing a numerical position is turned to that position. The starting switch is then closed, and the machine commences to successively feed cards to the sensing head. The cards are sensed, decoded and distributed to their proper pockets. A card not containing any perforations in the upper field is conveyed to the reject pocket for further sorting.

The proper pocket is determined by the perforations in the card. For example, a card containing a perforation in the second index position of the upper field represents the numeric character 1 and, according to the table set forth earlier herein, would be relegated to the No. 2 card pocket. The following would take place during sensing and decoding of this card. As the card is carried over the revolving sensing head the second sensing pin of a group will pass through the second index position. This will effect the closing of its related sensing contact 1, completing a circuit as follows, from the plus side of the rectifier R, over line 330, through the field switch FS closed on the upper field contact UFC, now closed sensing contact 1, line 331, through the coil of sensing relay 1, lines 332, 328, closed eraser contacts 327 to the negative side of the rectifier R, causing the energization of sensing relay 1. Energization of sensing relay 1 closes its holding contact 1 to create a holding circuit for relay 1 over the lines 320, contact HC1, line 333 coil of R1, line 332, 328 to insure energization until the card has been fully sensed. With the energization of relay 1 decoding contacts 23 through 33 are opened and decoding contacts 34 through 44 are closed.

The action on the decoding contacts creates a potential circuit from the positive side of the rectifier over lines 330, 334 through decoding contacts 71, 67, 59, 45, 34, through decoding contact terminal 1, terminal 1 of selector switch 2 to the positive side of the timing disc magnet coil 2. The circuit remains incomplete because of the open master timer contacts 323 in the negative line 325 from the rectifier to the timing disc magnet coil 2. The master timer contacts are cam operated and are timed to close upon completion of the card sensing cycle and before the sensing of a new card. Closing of the master timer contacts effects the energization of timing disc magnet 2, over line 325, and the consequent closing of timing disc contacts 2. Closing of the latter completes a circuit over the positive line 322, timing disc contacts 2, coil of pocket magnet 2, and back over negative line 321 to energize pocket magnet 2 and to effect the consequent opening of card pocket 2.

Momentarily after the energization of a timing disc magnet the eraser contacts 327 are momentarily cammed open to break the negative line 328, deenergize the affected sensing relay and restore the affected contacts to normal position in preparation for the sensing of the next card.

In the case of a card containing perforations in the second and sixth index positions, representing according to the code used in the numerical digit 2, the 3 pocket will be opened to receive the sensed card in the following manner. With the sensing of the card the second sensing pin of a group will penetrate the second index perforation and will establish a circuit energizing sensing relay 1 and affecting its related decoding contacts and holding contact, as described above.

The sixth index perforation will be penetrated by the sixth sensing pin of the group. This effects the closing of sensing contacts 9 causing the energization of sensing relay 9. Energization of sensing relay 9 closes its holding contact 9, whereby relay 9 is held energized until the card is fully sensed, opens decoding contacts 71, and closes decoding contacts 72. A potential circuit will be created over the positive lines 330, 334 through decoding contacts 72, 68, 61, 49, 41, closed by relay 1, decoding contact terminal 2, selector switch 3, to timing disc magnet 3. This circuit is completed with the closing of the master timer contacts 323 in the negative line 325 so as to effect the energization of timing disc magnet 3 and the consequent energization of pocket magnet 3 and the opening of the related card pocket 3. The eraser contacts 327 at the appointed time will break the circuit in line 328 to the affected sensing relays and will restore the related contacts to normal.

When the cards are to be sensed and sorted for alpha characters, such as shown in the lower card field, the field selector switch FS is turned to the lower field contact LFC. A card containing perforations in the 2nd, 4th and 6th index positions of the lower field represents the alpha character A and the card will be sorted into the first card pocket. The eighth, tenth, and twelfth sensing pins of a group will, in that order, penetrate the 2nd, 4th and 6th index perforations of the lower field of the card, creating circuits as follows. With the penetration of the 2nd index position, lower sensing contact 1 will close and a circuit will be created over the positive line 330, lower field contacts LFC, line 325, lower sensing contacts 1, line 336, coil of sensing relay 1, and negative line 328 to effect the energization of sensing relay 1. This results in a holding circuit through lock-holding contacts 1 to hold the sensing relay 1 energized until the end of the sensing cycle, and it also effects the opening of decoding contacts 23 through 33 and the closing of contacts 34 through 44, in the manner previously outlined.

With the penetration of the 4th index position in the lower field of the card the lower sensing contacts 5 are closed affecting, in a manner similar to the above, the energization of related sensing relay 5, creation of a holding circuit to the energized relay through the holding contacts 5, and causing related decoding contacts 61 to open and decoding contacts 65 to close.

With the penetration of the 6th index position in the lower field of the card, the lower sensing contacts 9 are closed affecting, in a manner similar to the above, the energization of its related sensing relay 9, creation of a holding circuit to the energized relay through the lock- ing contacts 9 and causing related decoding contacts 71 to open and 72 to close. With the closing of contact 72 a potential circuit is conditioned over lines 330, 334 through decoding contacts 72, 68, 65, 50, 43 to decoding contact terminal A, corresponding selector switch PSS1 to timing disc magnet 1. The circuit is completed and timing disc magnet 1 is energized by the closing of the master time contacts 224 in the negative line 325 resulting in the subsequent closing of the related timing disc contacts, energization of pocket magnet 1 and the opening of card pocket 1 in time to receive the sensed card.

While I have described what I consider to be a highly desirable embodiment of my invention, it is obvious that many changes in form could be made without departing from the spirit of my invention and I, therefore, do not limit myself to the exact form herein shown and described nor to anything less than the whole of my invention as herein set forth and as hereinafter claimed.

What I claim as new and desire to secure by Letters Patent, is:

1. In a machine of the character described for sorting statistical cards bearing characters in the form of one or more code perforations arranged in a single column of the card, a continuously rotating sensing unit, means for continuously feeding cards over the rotating sensing unit, the sensing unit including pin means in single file order for successively sensing the perforations of each card, and in so doing closing one or more sensing circuits, decoding means serving to elicit a single circuit from the circuits closed in the sensing of a card, the elicited circuit being representative of the character coded into the sensed card, a plurality of card receiving pockets each representative of a particular elicited circuit, continuously operating means for conveying the sensed cards to their destined pockets, and timing mechanism under control of said decoding means and including a separate actuating member operatively associated with each circuit elicited and the related card pocket whereby the related card pockets are opened in timed relation to the passage of the cards.

2. In a sorter for statistical cards bearing character designations in the form of coded combinational perforations of index positions in a single card column, a continuously rotating sensing means, a plurality of pockets into which cards are distributed in accordance with the analysis of the cards by the sensing means, electrical spring contacts closable in combinations determined by the sensing means during the analysis of a card to create a corresponding combination of sensing circuits for each card sensed, a decoding system for eliciting a single circuit from each created combination of the sensing circuits, and a timing mechanism controlled by said decoding system for selectively operating said pockets and comprising a continuously rotating shaft and a plurality of timing disc elements carried upon the shaft, each timing disc element being individual to a card pocket and responsive to a particular elicited circuit and so constructed and arranged that the proper pocket is opened in time to receive the sensed card.

3. In a machine for sorting statistical cards having an upper field and a lower field and bearing character designations in either field in the form of one or more code perforations of index points arranged in a single column of the card, the combination of a continuously rotating sensing pin unit, means for continuously feeding cards over the sensing unit for sensing, a plurality of pockets for receiving the sensed cards according to the character designations of the cards, roller means for conveying the cards sensed from the sensing unit to their respective pockets, sensing circuits including circuit closing contacts closeable by the sensing pin unit in the sensing of the perforations of a card, manual control means for limiting the circuits to be created to those relating to one of the two fields, means for holding the circuits created closed until all the perforations of a card column have been sensed, decoding means responsive to the sensing circuits created to elicit a single circuit therefrom, the elicited circuit being representative of both the character designated by the code perforations in the sensed card and the related card pocket, and timing means conditionable by the elicited circuit for opening the pocket representative of the elicited circuit in timed relation to the travel of the card.

4. In a sorter of the nature set forth utilizing statistical cards bearing character designations in the form of one or more perforations in code of index points arranged in a column of the card, a combined sensing unit and carriage arrangement serving in the analysis of the cards to be sorted including a carriage movable transversely of the machine and having a pair of side frame plates, a continuously rotating square shaft, a sensing unit slidable transversely of the machine along the shaft and adapted to rotate with the shaft, a plurality of normally open circuit closing spring contacts, each contact representative of an index point of the card and carried between the carriage frame plates in a fixed position, a plurality of actuating members carried in a set position between the carriage frame plates and each pivotable to close a separate spring contact, a plurality of cam elements adapted for rotation by the sensing unit and operatively associated with the pivotable members, a disc member carried for rotation by the sensing unit and including a plurality of sensing pins, the sensing pins serving to sense the index points of a card column during the rotation of the sensing unit, each pin being representative of a card index point and an associated cam element, linkage between each sensing pin and its related cam element so constructed and arranged that, when a sensing pin finds a perforated index point, a cam element is adapted to move a pivotable member to close a contact related to the perforated index point, manual means adapted to move the carriage to a selected position transversely of the machine, bearing means associating the carriage with the sensing unit whereby the sensing unit is moved to a selected position along the square shaft with the movement of the carriage and the cam elements of the sensing unit are carried with it in operative association with the pivotable members of the carriage.

5. In a sorting machine of the character described of statistical cards bearing data indicative perforations, including a rotary sensing unit having a disc member and a plurality of sensing pins slidable in and out of the periphery of the disc member, a plunger rod associated with each sensing pin and movable from a normal position to a second position and carrying a cam in a fixed position thereon, contact closing means operable by the cam of each plunger rod when in its normal position, spring means constantly urging each plunger rod to its normal position, bell crank means operatively connected with each plunger rod with an associated sensing pin and pivotally positioned by the plunger rod in its normal position to constantly press the sensing pin partly out of the periphery of the disc member, the sensing pins being adapted upon finding a card perforation to penetrate such, and upon finding an unperforated card surface to be pressed thereby into the periphery of the disc member whereby the related bell crank means is caused to pivot and move the plunger rod against the tension of its spring to its second position.

6. In a sorting machine as in claim 5, wherein the contact closing means comprises a two armed lever, one arm of which is engageable by the cam of the related plunger rod whereby the lever is caused to pivot and the other arm of the lever is caused to close an associated electrical contact as a consequence.

7. In a machine of the class described for sorting record cards bearing columnarily arranged data indicative perforations, a rotary sensing unit comprising a disc member supported for rotation in the plane of the column of perforations to be sensed, a plurality of sensing pins arranged circumferentially about said disc member and radially slidable to project beyond the periphery of said disc member, an individual plunger rod operatively associated with each sensing pin and carried by said unit for rotation with the associated pin, each of said plungers extending transversely to the plane of said disc member and yieldably urged to slide the pin associated therewith beyond the periphery of said disc member, each of said rods being shiftable by the axial movement of an associated sensing pin when bearing on an unperforated area of the record being sensed, a camming element carried by each of said rods and shiftable therewith, and contact closing members including one for each of said camming elements disposed for operative engagement by the related cam element when in one of its shifted positions at a predetermined point in the rotation of said sensing unit whereby said contact closing members are selectively actuated by said camming elements in accordance with the radial disposition of said sensing pins when passing said predetermined point of rotation as determined by the relative location of the perforated and unperforated areas of the record column being sensed.

8. In a machine of the class described for sorting record cards bearing columnarily arranged data indicative perforations, a rotary sensing unit comprising a disc member supported for rotation in the plane of the column of perforations to be sensed, a plurality of sensing pins arranged circumferentially about said disc member and radially slidable to project beyond the periphery of said disc member, an individual camming element operatively associated with each sensing pin and carried by said unit for rotation with the associated pin, each of said camming elements being yieldably urged transversely to the plane of said disc member from an inoperative to operative position, individual bell cranks operatively connecting each of said camming elements with the associated sensing pin, each of said bell cranks transferring the yieldable movement of a camming element to the associated sensing pin and responsive to the axial movement of the associated sensing pin when bearing on an unperforated area of the record being sensed for shifting the associated camming element to the inoperative position, and contact closing members including one for each of said camming elements disposed for operative engagement by the related cam element when in its operative position at a predetermined point in the rotation of said sensing unit, whereby said contact closing members are selectively actuated by said camming elements in accordance with the radial disposition of said sensing pins passing said predetermined point of rotation as determined by the relative location of the perforated and unperforated areas of the record column being sensed.

References Cited in the file of this patent

UNITED STATES PATENTS

| | | |
|---|---|---|
| 1,376,556 | Lasker | May 3, 1921 |
| 1,432,345 | Lasker | Oct. 17, 1922 |
| 1,502,993 | Lasker | July 29, 1924 |
| 1,698,844 | Ford | Jan. 15, 1929 |
| 1,716,677 | Wyllie | June 11, 1929 |
| 1,745,388 | Tauschek | Feb. 4, 1930 |
| 1,799,186 | Stuivenberg | Apr. 7, 1931 |
| 1,930,266 | Ford | Oct. 10, 1933 |
| 2,209,414 | Maul | July 30, 1940 |
| 2,454,628 | Braun | Nov. 23, 1948 |
| 2,492,664 | Seipos | Dec. 27, 1949 |